United States Patent
Parker et al.

(10) Patent No.: US 6,854,703 B2
(45) Date of Patent: Feb. 15, 2005

(54) PRESSURE REGULATING VALVE WITH ADJUSTMENT FEATURES

(75) Inventors: David G. Parker, Shelby, NC (US);
Alfred J. Babineau, Jr., Shelby, NC (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/235,851

(22) Filed: Sep. 6, 2002

(65) Prior Publication Data

US 2003/0137378 A1 Jul. 24, 2003

Related U.S. Application Data

(60) Provisional application No. 60/317,125, filed on Sep. 6, 2001.

(51) Int. Cl.[7] .................................................. F16K 31/02
(52) U.S. Cl. .............................. 251/30.01; 251/129.15; 335/236
(58) Field of Search .............................. 251/30.01, 38, 251/129.15; 123/458, 446, 514; 335/236, 237

(56) References Cited

U.S. PATENT DOCUMENTS

| 5,191,867 A | 3/1993 | Glassey |
| 5,513,832 A | 5/1996 | Becker et al. |
| 5,757,259 A | 5/1998 | Fulford et al. |
| 6,029,703 A | * 2/2000 | Erickson et al. ....... 137/625.61 |
| 6,116,263 A | 9/2000 | Liberfarb |

OTHER PUBLICATIONS

David G. Parker et al., U.S. Appl. No. 60/305,602, filed Jul. 17, 2001.

* cited by examiner

*Primary Examiner*—Edward K. Look
*Assistant Examiner*—John K. Fristoe, Jr.
(74) *Attorney, Agent, or Firm*—Kris T. Fredrick

(57) ABSTRACT

There is provided an electromagnetic actuator which includes a coil disposed about a tube bearing a movable armature, the coil being electrically connectable to a circuit configured to provide a current to the coil to generate a magnetic field and magnetic flux in at least one direction. The movable armature is magnetically coupleable with the coil. A flux adjustment element is also provide and is configured for movement within a magnetic flux output by the coil so as to increase a magnetic flux input to the armature upon movement of the flux adjustment element in a first direction and to decrease a magnetic flux input to the armature upon movement of the flux adjustment element in a second direction, wherein the flux adjustment element is externally disposed about a distal end of the tube.

18 Claims, 21 Drawing Sheets

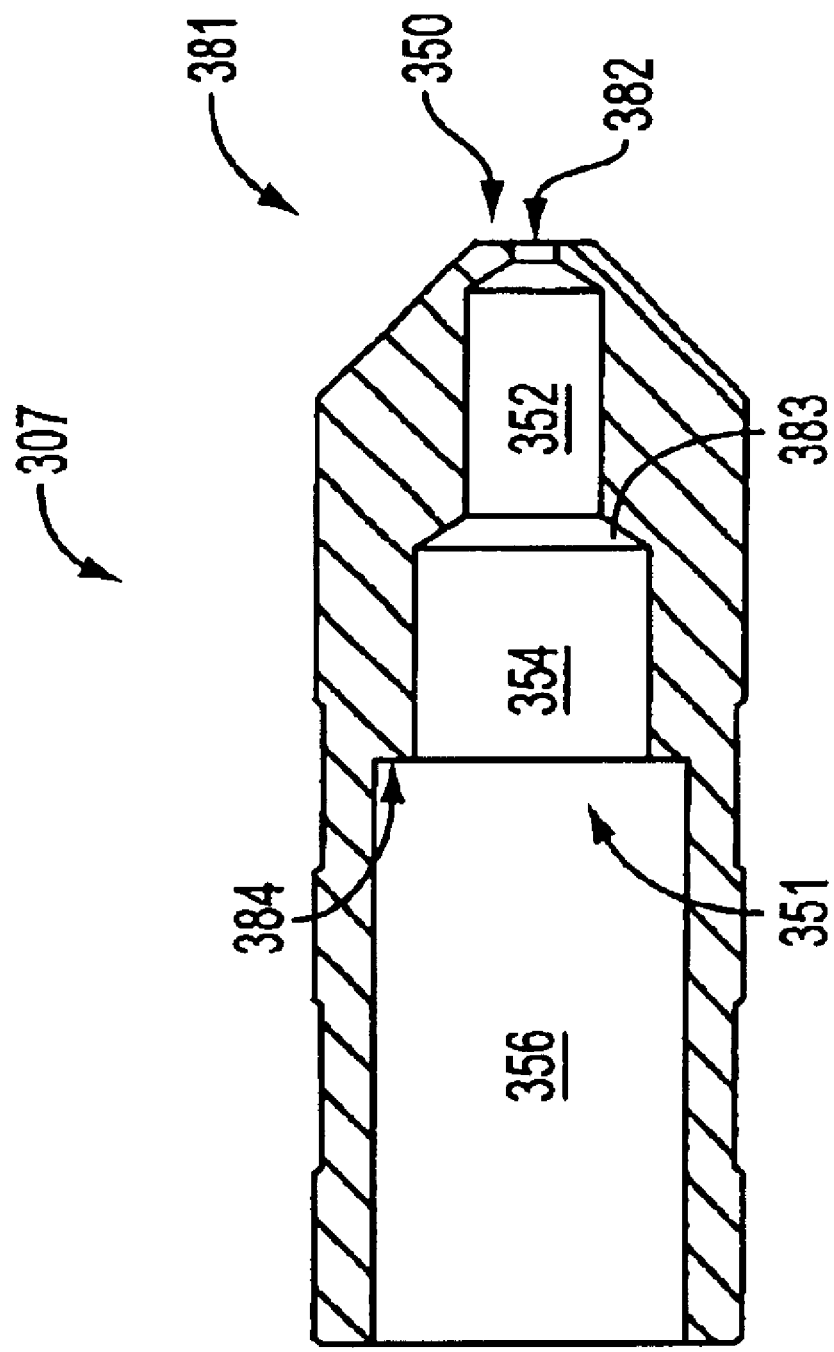

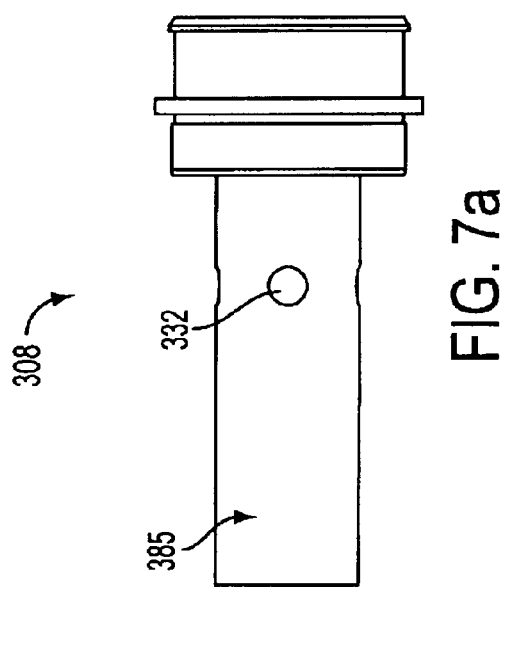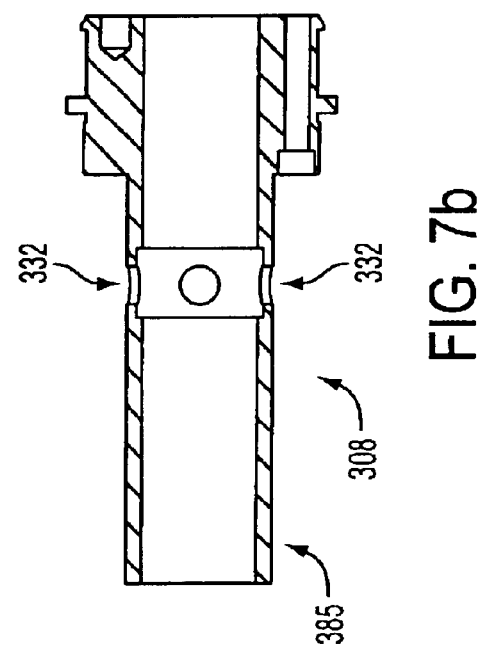

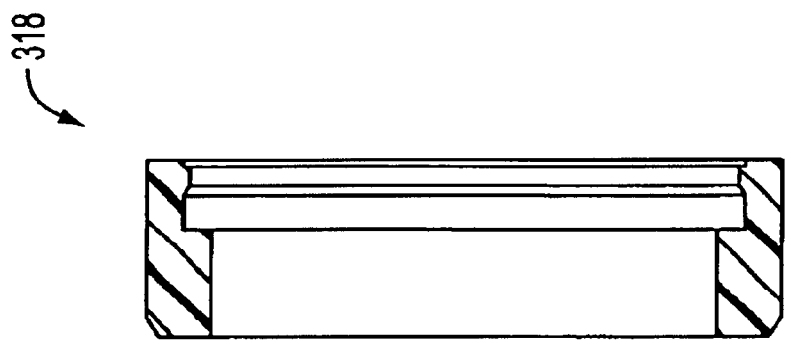
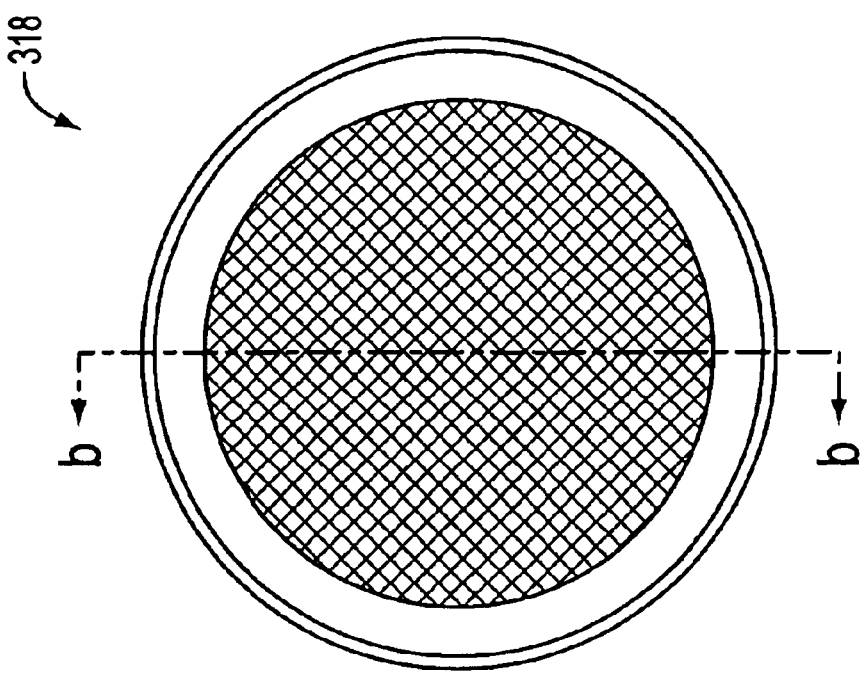

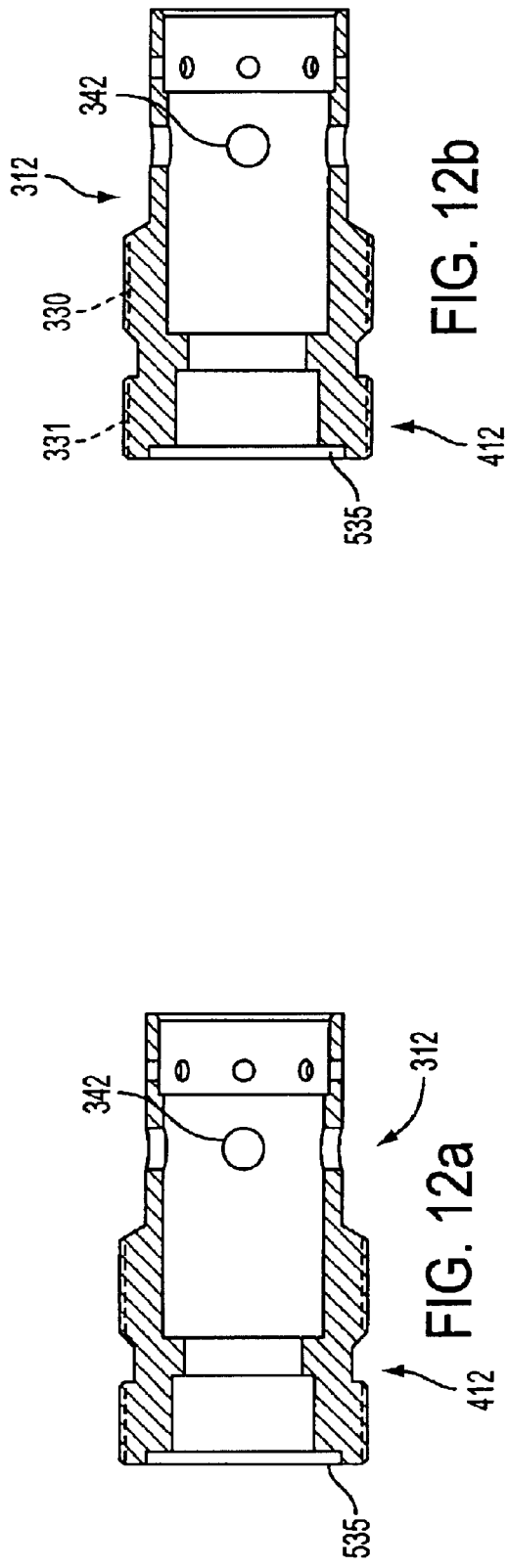

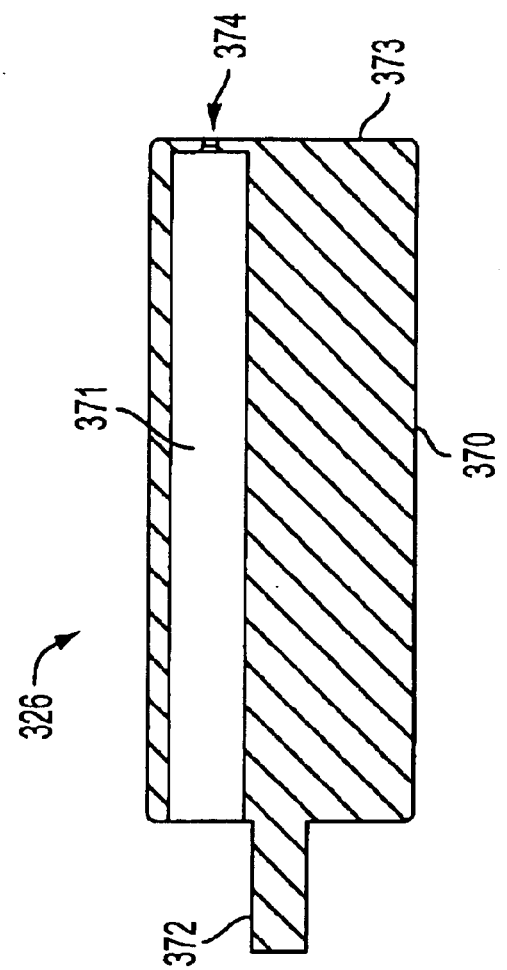
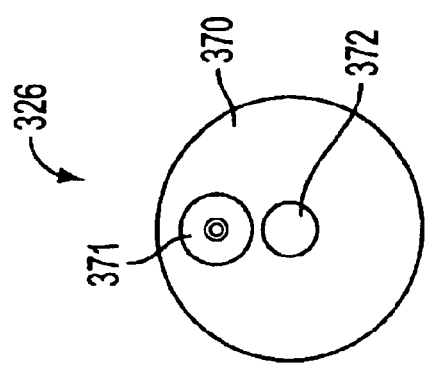
FIG. 14b
FIG. 14a

| FLUX RING POSITION | CURRENT (mA) | | | | | | | | |
|---|---|---|---|---|---|---|---|---|---|
| | 900 | 800 | 700 | 600 | 500 | 400 | 300 | 200 | 100 |
| | FORCE (NEWTONS) | | | | | | | | |
| 34.9 | 55.4 | 49.75 | 43.3 | 34 | 24.4 | 15.5 | 8.7 | 3.8 | 0.89 |
| 33.9 | 56.8 | 51 | 43.8 | 34.8 | 24.8 | 15.9 | 8.9 | 3.88 | 0.94 |
| 32.9 | 57.7 | 52.1 | 45.1 | 36.2 | 25.9 | 16.7 | 9.3 | 4.05 | 0.98 |
| 31.9 | 58.9 | 53.2 | 47.1 | 37.2 | 26.8 | 17.3 | 9.6 | 4.19 | 1 |
| 30.9 | 59.4 | 53.7 | 46.8 | 38.7 | 28.2 | 18.2 | 10.2 | 4.43 | 1.06 |
| 29.9 | 60.62 | 55 | 48.4 | 39.5 | 29 | 18.6 | 10.4 | 4.5 | 1.09 |
| 28.9 | 60.78 | 55.3 | 48.7 | 40 | 29.4 | 19.1 | 10.6 | 4.6 | 1.1 |

PRESSURE REGULATING VALVE WITH ADJUSTMENT FEATURES

CROSS-REFERENCE TO PROVISIONAL APPLICATION

This application claims priority from U.S. Provisional Patent Application Ser. No. 60/317,125 filed Sep. 6, 2001, the entire disclosure of which is incorporated herein by reference.

FIELD OF THE INVENTION

The invention relates to electomagnetically actuated devices. One example of such device would include electromagnetically actuated valves. One such electromagnetically actuated valve could include, but is not limited to, a pressure control valve, such as, for example, a rail or manifold pressure in Hydraulically-actuated Electronically-controlled Unit Injector (HEUI) fuel systems used in diesel engines.

BACKGROUND OF THE INVENTION

Gasoline engines use a pressurized fuel system wherein a computer is used to vary the actuation of the fuel injectors to meet a demand based on the input from various sensors. Since gasoline engines have an ignition system to ignite an air/fuel mixture in the cylinders, the fuel pressure only needs to be high enough to provide an adequate spray pattern to ensure efficient combustion. Diesel engines, on the other hand, use heat from compression to ignite the air/fuel mixture. The high compression levels require correspondingly high air/fuel mixture injection pressures, as well as appropriate control and delivery systems.

FIG. 1 shows one variant of a typical HEUI fuel system 10 adapted for an 8-cylinder direct-injection diesel-cycle internal combustion engine, disclosed in U.S. Pat. No. 5,757,259 issued to Fulford et al. on May 26, 1998, hereby incorporated by reference. As shown therein, HEUI fuel system 10 includes one or more hydraulically-actuated electronically-controlled injectors 18 positioned in a respective injector bore, an actuating fluid supplying means 20 for supplying hydraulically-actuating fluid to each injector 18, apparatus or fuel supplying means 22 for supplying fuel to each injector 18, and apparatus or electronically-controlling means 24 for electronically controlling the fuel injection quantity, injection timing, and/or fuel injection pressure of the injectors 18 independent of engine speed and load.

Another example of a HEUI fuel system may be found, for example, in U.S. Pat. No. 5,191,867 issued to Glassey et al. on Mar. 9, 1993.

The hydraulically actuating fluid supplying means 20 includes an actuating fluid sump 26 (e.g., an engine lubrication oil sump, crankcase, or oil pan), a relatively low pressure actuating fluid transfer pump 28, an actuating fluid cooler 30, one or more actuating fluid filters 32, a source or actuating fluid pressurizing means 34 for selectively pressurizing actuating fluid to a variable relatively higher pressure than that delivered to it by the transfer pump 28, at least one relatively high pressure actuating fluid manifold 36,38, and an actuating fluid pressure controlling means 40 for electronically or variably controlling the magnitude of the actuating fluid pressure supplied to the injectors 18 via the manifold(s) 36,38. The hydraulic supply pump is a seven piston fixed displacement axial piston pump. During normal engine operation, pump output pressure is controlled by a Rail Pressure Control Valve (RPCV) 58, an electrically operated dump valve which closely controls pump output pressure by dumping excess flow to a return or drain circuit. A variable signal current from an electronic control module (ECM) 160 to the RPCV 58 determines pump output pressure, which is generally maintained between 400 psi and 3000 psi during normal engine operation.

One actuating fluid manifold 36,38 is provided for and associated with each cylinder head having a bank of injectors 18. Each manifold 36,38 accumulates pressurized actuating fluid delivered by the pressurizing means 34 and intermittently feeds such pressurized actuating fluid to an actuating fluid inlet passage of each hydraulically-actuated fuel injector 18 associated with that manifold. Each actuating fluid manifold 36,38 has one common rail passage 42,44 and a plurality of individual rail branch passages (not shown). Each common rail passage 42,44 is arranged downstream of the pressurizing means 34 and is in fluid communication between the pressurizing means 34 and the respective bank of injectors 18. The number of rail branch passages for each manifold 36,38 corresponds to the number of injectors 18 positioned in each cylinder head. Each rail branch passage extends between its respective common rail passage 42,44 and an actuating fluid inlet passage of a respective injector 18.

The means 24 for controlling the actual fuel injection quantity, injection timing, and/or fuel injection pressure of the injectors 18 includes the aforementioned ECM 160 and an electronic drive unit (EDU) 162. ECM 160 includes software and hardware that cooperatively define optimum fuel system operational parameters and controls both the RPCVs 58 and the injectors 18 through appropriate sensors and control circuitry and devices. For example, sensor 56 is electrically connected to the ECM 160 and provides signals indicative of the magnitude of the actuating fluid pressure in the manifolds 36,38. ECM 160 is also electrically connected to EDU 162, which in turn is connected to the solenoid or other electrically-controllable actuator of each injector 18. EDU 162 is thus configured to energize an injector 18 solenoid (not shown) so as to lift the injector 18 poppet valve (not shown) off its seat and permit fuel discharge, the fuel being supplied to injector 18 by a line connected to fuel tank 22, from injector 18. Fuel injection stops when the ECM 160 signals the EDU 162 to stop the current to the solenoid, whereupon termination of the current permits an injector poppet spring (not shown) to close the poppet valve and block the high pressure supply oil from the rail from discharge through the injector 18.

Pressurizing means 34 includes an actuating fluid pump 48, such as a gear-driven fixed-displacement axial piston pump 48. As indicated by dashed lines in FIG. 1, the actuating fluid pump 48 includes a first passage 50 adapted to be in fluid communication with the relatively high pressure pumping chamber(s) of the pump 48 and a second passage 52 or manifold pressure chamber adapted to be in continuous fluid communication with each of the manifolds 36,38. A third passage 54 is adapted to be in continuous fluid communication with the relatively low pressure actuating fluid sump 26.

As shown in FIG. 1, the actuating fluid pressure controlling means 40 includes at least one actuating fluid pressure sensor or transducer 56 and a proportional pressure control valve assembly 58 to control rail pressure. Sensor 56 is positioned on a manifold 36,38 downstream of pump 48 but upstream of injectors 18 in the actuating fluid flowpath. Valve 58 is typically adapted to be installed in the backplate of pump 48 and is configured to selectively bypass a variable amount of actuating fluid from the relatively high pressure pump 48 back to the relatively low pressure sump 26 via passage 54.

As shown in FIG. 2, also disclosed in the aforementioned U.S. Pat. No. 5,757,259 issued to Fulford et al., rail pressure control valve (RPCV) 58 includes an adapter 62 having an adapter bore 64, a cylindrical tube 66 connected to the adaptor 62, a tube stop 68 connected to or formed on one end portion of the tube 66, an axially-movable armature 76, a stator or pole piece 78 connected to adapter 62 via an internal wall defining adapter bore 64, an axially-movable push pin 80, an axially-movable pilot poppet 82, a cage 84 connected to the internal wall defining adapter bore 64, a poppet seat member 86 positioned between adapter 62 cage 84, an axially-movable (valve) spool 88, a first helical compression spring 90, a pilot stage edge filter cartridge 92, and a second helical compression spring 94.

Stator 78 and movable armature 76 collectively define an expandable armature chamber 96. Stator 78 and poppet seat 86 collectively define a pilot pressure chamber 97. Poppet seat 86, one end portion of the spool 88, and cage 84 collectively define a set pressure chamber 98. Cage 84 and another end portion of the spool 88 collectively define a valve inlet pressure chamber 100. A counterbore of the pump 48 and the cage 84 collectively define a drain chamber 104 arranged in continuous fluid communication with the sump 26 via the third internal passage 54. Stator 78 includes a vent passage 112, such as a slot extending across the outer surface of the stator 78, arranged in continuous fluid communication between armature chamber 96 and the pilot pressure chamber 97.

Poppet seat member 86 includes a bore slidably receiving poppet 82, a frusto-conical seat positioned at an end portion of the bore wherein the seat is selectively opened or closed by the movable poppet 82, one or more radial passages 118 positioned downstream of the seat and in continuous fluid communication with the pilot pressure chamber 97. An orifice 122 is adjacent to an upstream of the seat and a restricted passage 120 downstream of the orifice 122 are arranged in continuous fluid communication with the set pressure chamber 98. The movable poppet 82 selectively closes and opens fluid communication between set pressure chamber 98 and the pilot pressure chamber 97 depending upon whether the seat is closed or opened by poppet 82.

Adapter 62 includes a restricted pilot drain passage 124 arranged in continuous fluid communication with the sump 26 via the drain chamber 104 and the passage 54. Passage 124 includes a pilot drain orifice 126, extending radially outwardly from the adapter bore 64 to the outer periphery of the adapter 62, and a peripheral drain slot 128 intersecting the orifice 126. Restricted pilot drain passage 124 helps isolate and stabilize the fluid pressure in the pilot pressure chamber 97 from the relatively-lower-pressure drain passages leading to the sump 26. The restricted passage 124 also helps to maintain the pressure in the armature chamber 96 and pilot pressure chamber 97 at a predetermined level (e.g., slightly pressurized) to prevent air entrained in the actuating fluid from coming out of solution at least until the actuating fluid exits the RPCV 58. The restricted passage 124 also creates a hydraulic lock in chambers 96,97 so as to restrict or inhibit actuating fluid from draining from the chambers 96,97 after the HEUI fuel system 10 is shutoff. The restricted passage 124 effectively also lowers the pressure gain across the restricted passage 120 of the poppet seat 86 by maintaining a minimum pressure level in the armature chamber 96.

Cage 84 includes one or more radially-extending drain passages 130. Spool 88 has a reduced diameter end portion or annulus 132 facing the valve inlet pressure chamber 100 which selectively registers with the drain passages 130 of the cage 84.

The hydraulic energy of the pressurized oil permits injection of the fuel/air mixture into the combustion chamber by the injector 18. The pressure of the incoming oil controls the speed of the injector's intensifier piston (not shown) and plunger (not shown) movement, and therefore, the rate of injection. The amount of fuel injected is determined by the duration of the pulse from the EDU and energization of the solenoid.

When the engine is off, as shown in FIG. 2, spool 88 is held to the right by return spring 90 and the drain passages 130 are closed, isolating the system from sump 28. A predetermined starting actuating fluid pressure is required to start the engine. To start even a relatively warm engine, approximately 1,500 psi of oil pressure is generally required. If the engine is cold (i.e., coolant temperature is below 32° F.), approximately 3000 psi of oil pressure is generally required for start. During cranking, the ECM 160 sends a signal to the RPCV 58 to provide a minimum predetermined actuating fluid pressure to manifolds 36, 38.

During start-up or cranking, pump outlet pressure enters the right-end of the body through manifolds 36, 38, as illustrated, and a small amount of oil flows into the spool chamber or set pressure chamber 98 through the pilot stage filter screen 92 and control orifice 166 provided in the spool 88. At this time, the ECM 160 provides a signal causing the solenoid to generate a magnetic field proportional to the current applied to the solenoid coils 142 which biases the armature 76 to the right, toward the stator 78. The armature 76 exerts a force on the push pin 80 and poppet 82 to seat the poppet 82 against the seat of the poppet seat member 86. This closes passage 120 and permits fluid pressure to increase in the spool chamber 98. Thus, the combination of spool spring 94 force and spool chamber 98 pressure holds the spool 88 to the right so as to close drain ports 130. All oil provided by the pump is accordingly directed to the pressure rail manifolds 36, 38 until the desired minimum starting fluid pressure is reached.

Once the desired minimum starting fluid pressure for starting is reached, the ECM 160 sends a signal to the RPCV 58 to modulate so as to provide an actuating fluid pressure in the manifolds 36, 38 commensurate with operating conditions. This control loop is achieved by ECM 160 measurement of actual manifold pressure by means of a pressure sensor 56 and appropriate adjustment of the signal (i.e., electrical current) applied to the RPCV 58 to provide measured bleed from the spool chamber 98 through drain passages 130 to sump 26.

During normal engine operation, pump outlet pressure enters the (right) end of the RPCV 58 body and a small amount of oil flows into spool chamber 98 through the pilot stage filter 92 and control orifice 166, as noted above. The pressure in spool chamber 98 is controlled by adjusting the position of poppet 82, which permits bleed off of oil from the spool chamber 98 through drain passages 130. The position of poppet 82 is controlled by the strength of the magnetic field of the solenoid coils 142, which depends upon the current supplied by ECM 160. The spool 88 responds to pressure changes in the spool chamber 98 on the left side of the spool by axial translation to maintain a force balance between the right and left side of the spool. The axial position of spool 88 determines how much area of the drain passage 130 ports are open to spool chamber 98 and this open area directly affects the quantity of oil bled off and, correspondingly, rail or manifold 36, 38 pressure. In operation, the ECM 160 and RPCV 58 are highly responsive; and the spool 88 rapidly responds to pressure changes on either side of the spool by axial-translation about a partially-open position.

Ideally, as shown in FIG. 3, there is an ideal pressure output by the RPCV 58 in accord with a specified current supplied to coils 142 by ECM 160. For example, a current of 0.8A should produce an output pressure of about 4000 psi. However, current RPCV's and related valves are limited in both valve-to-valve variability and accuracy. The valve-to-valve variability for such valves has been known to approach ±25% of the ideal curve. In view of the ever increasing sophistication of automobile engine control systems and omnipresent need for improved fuel efficiency, improved power, and decreased emissions, such valve-to-valve variability and accuracy limitations are potentially insufficient to meet the needs of future engine designs. Further, such variability undesirably increases manufacturing costs.

Therefore, it is desirable to provide a method and device for reducing variability between electromagnetically actuated devices and improving accuracy of such devices and products incorporating such devices. As one example, for such pressure regulating valve applications as discussed above, it is desirable to reduce valve-to-valve variability and improve accuracy.

SUMMARY OF THE INVENTION

In one aspect, there is provided an electromagnetic actuator, comprising a tube having a proximal and a distal end and a coil disposed about the tube. The coil is electrically connectable to a circuit configured to provide a current to the coil to generate a magnetic field and magnetic flux. A movable armature having a proximal and a distal end is borne within the tube, the armature being at least partially circumscribed by the coil and being configured for magnetic coupling with the coil, the magnetic coupling urging the armature to move within the tube. The armature is thus configured to transmit a force imparted thereto by a magnetic flux output by said the out of said electromagnetic actuator. A flux adjustment element is also provided and is configured for movement within a magnetic flux output by the coil so as to increase a magnetic flux input to the armature upon movement of the flux adjustment element in a first direction and to decrease a magnetic flux input to the armature upon movement of the flux adjustment element in a second direction, wherein the flux adjustment element is externally disposed about the distal end of the tube adjacent the distal end of the armature.

In another aspect, the above-noted electromagnetic actuator further includes an armature travel adjustment element, wherein the armature travel adjustment element is disposed to enter a distal end of the tube and is configured for movement in an advancing direction toward a proximal end of the tube and a withdrawing direction away from the proximal end of the tube so as to correspondingly increase or decrease an armature travel within the tube.

In still another aspect, a pressure control valve is provided and comprises an inlet for receiving an operating fluid from a pump, a movable valve element configured to selectively control a pressure of the operating fluid on a downstream side of the movable valve element responsive to a force imparted thereto by an electromagnetic actuator, and an electromagnetic actuator. The electromagnetic actuator includes a tube having a proximal and a distal end, a coil disposed about the tube, the coil being electrically connectable to a circuit configured to provide a current to the coil to generate a magnetic field and magnetic flux. A movable armature having a proximal and a distal end is borne within the tube. The armature is at least partially circumscribed by the coil and is configured for magnetic coupling with the coil, wherein the magnetic coupling urges the armature to move within the tube. The armature is configured to transmit a force imparted thereto by a magnetic flux output by the coil out of the electromagnetic actuator. The electromagnetic actuator also includes a flux adjustment element configured for movement within a magnetic flux output by the coil so as to increase a magnetic flux field input to the armature upon movement of the flux adjustment element in a first direction and to decrease a magnetic flux field input to the armature upon movement of the flux adjustment element in a second direction, wherein the flux adjustment element is externally disposed about the distal end of the tube adjacent the distal end of the armature.

In still another aspect, there is provided an injector pressure regulator valve for controlling pressure to a hydraulic rail of a hydraulically actuated electronically controlled fuel injection system, the injector pressure regulator valve comprising a main body with a control cavity having an inlet for receiving a working fluid output from a pump, an outlet for supplying the working fluid under regulated pressure to the hydraulic rail, and a drain port for allowing bleed-off of the working fluid from the control cavity to a sump. The injector pressure regulator valve also including a main valve configured to slide within the control cavity and configured to selectively close and open the drain port of the control cavity and a control valve disposed downstream of the main valve for receiving the working fluid under pressure and for selectively passing, based on a position of the control valve relative to a respective control valve seat, the working fluid to the outlet, wherein the selective passing of the working fluid to the outlet by the control valve regulates a force balance between an upstream and a downstream side of the main valve, thereby urging the main valve in a selected direction relative to the drain port to adjust an upstream pressure thereto. An electromagnetic actuator is further provided for actuating the control valve in response to an electronic signal, the electromagnetic actuator comprising a stator winding for receiving the electronic signal and generating a variable magnetic field in response thereto, and movable armature actuated by the magnetic field of the stator winding. A movable flux member is interposed between the stator winding and the movable armature, positioning of which between the stator winding and the movable armature adjusts the flux coupling between the stator winding and the movable armature so as to set the responsiveness of the electromagnetic actuator to the electronic signal. An armature travel adjustment member is also provided and is attached to a body member of the electromagnetic actuator for adjustably limiting movement of the armature.

In yet another aspect, a method for reducing manufacturing variability in an electromagnetic actuator is provided and comprises the step of proving an electromagnetic actuator. The provided electromagnetic actutator comprises a tube having a proximal and a distal end and a coil disposed about the tube, the coil being electrically connectable to a circuit configured to provide a current to the coil to generate a magnetic field and magnetic flux. A movable armature having a proximal and a distal end is borne within the tube, the armature being at least partially circumscribed by the coil, the armature configured for magnetic coupling with the coil, the magnetic coupling urging the armature to move within the tube and the armature being configured to transmit a force imparted thereto by a magnetic flux output by the coil out of the electromagnetic actuator. The provided electromagnetic actuator also includes at least one of (1) an external flux adjustment element configured for movement within a magnetic flux output by the coil so as to increase a magnetic flux field input to the armature upon movement of the flux adjustment element in a first direction and to decrease a magnetic flux field input to the armature upon movement of the flux adjustment element in a second direction and (2) an external armature travel adjustment element disposed to enter a distal end of the tube and configured for movement in an advancing direction toward a proximal end of the tube and a withdrawing direction away from the proximal end of the tube so as to correspondingly increase or decrease an armature travel within the tube. The method also includes the step of attaching the electromagnetic actuator to a test stand configured to generate an output signal corresponding to a force generated by the armature based on a predetermined current input to the electromagnetic actuator coil. The method also includes the step of adjusting at least one of the external flux adjustment element and the external armature travel adjustment element responsive to the output signal to vary a corresponding magnetic flux field input to the armature and a range of travel permitted thereby so as to correspondingly increase or decrease the output signal until the output signal substantially corresponds to a predetermined output signal or falls within a range of predetermined output signals corresponding to the predetermined current input.

Additional features and advantages of the present invention will become readily apparent to those skilled in the art from the following detailed description, wherein only preferred embodiments of the invention are shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein:

FIG. 6 shows a main poppet.

FIGS. 7a and 7b show, respectively, a view of a seat and a cross-sectional view thereof.

FIGS. 11a–11b show, respectively, a front view of an external filter element and a cross-sectional view thereof.

FIGS. 12a–12c show, respectively, side views of a valve seat and a cross-sectional view thereof.

FIGS. 14a–14b show a front view and a cross-sectional side view of an armature.

DETAILED DESCRIPTION OF THE INVENTION

Features for adjusting an electromagnetic actuated device to enhance accuracy and to minimize variability between manufactured electromagnetic actuated devices. One example of an electromagnetic actuated device includes electromagnetically actuated valves. An example of an electromagnetically actuated valve includes an electromagnetically actuated pressure control valve. One such electromagnetically actuated pressure control valve design is discussed below, by way of example, in relation to the features of adjusting an electromagnetic actuated device associated therewith to enhance accuracy and to minimize variability between such valves.

Figure 4:
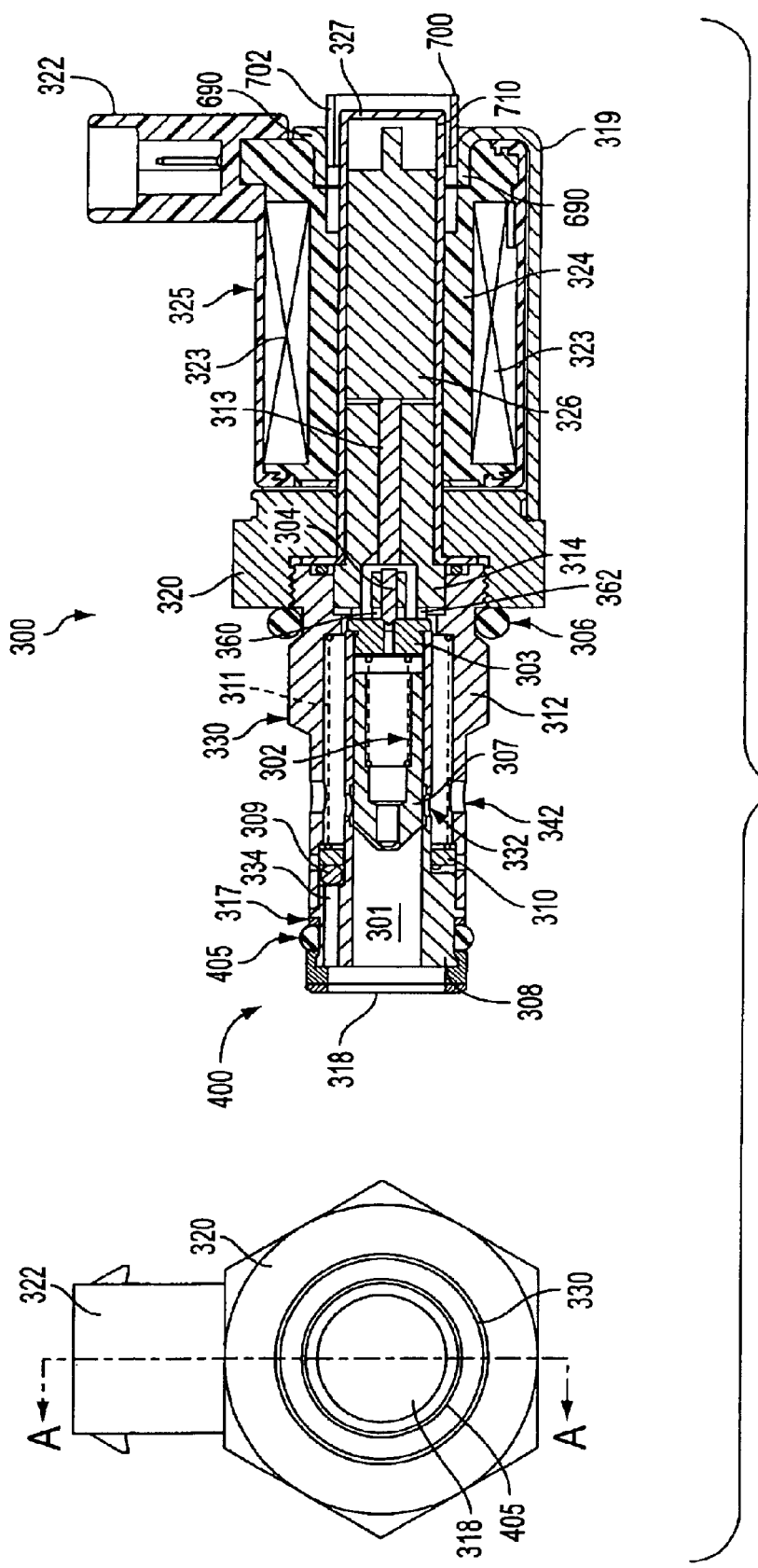
FIG. 4 shows a front view and a cross-sectional view of an Injector Pressure Regulator Valve (IPR).

FIG. 4 shows an Injector Pressure Regulator Valve (IPR) 300 in accord with the herein-described embodiment. IPR 300 is an electronically-controlled pilot operated pressure control valve including main poppet 307, pin poppet or secondary poppet 304, push pin 313, and armature 326, each configured for translational or reciprocating motion along a longitudinal axis of the assembly. The main poppet 307 translates within main poppet seat 308 based on a force differential between a front side and a back side of the poppet, inclusive of a pressure in IPR 300 inlet 301 and a spring bias applied to the inside or rear of the poppet by poppet spring 302, as discussed herein. Poppet spring acts against a suitable support, such as secondary poppet seat 303. These components together form a cartridge assembly 500, illustrated in FIG. 5a.

In one configuration, shown in FIG. 6 the main poppet 307 is made from an SAE 12L14 steel or equivalent having an outer diameter of approximately 7.38 mm and a length of about 20.30 mm. Head 381 of poppet 307 is frustoconical in form, having a centrally disposed front end 350 having a diameter of approximately 2.0 mm and bearing an orifice inlet 382 to valve body 312. In one aspect, the orifice inlet 382 comprises a converging opening having a diameter of about 0.736 mm at the front end 350 and a diverging portion opening to a diameter of about 2.0 mm. From front end 350, head 381 extends radially outwardly and rearwardly at an angle of about ±45° from the longitudinal axis. Poppet 307 includes a main poppet chamber 351, which comprises three inner sections 352, 354, 356 of increasing diameter (e.g., about 2.0 mm, 4.2 mm, and 5.50 mm, respectively). A diverging transition 383 having an angle of about ±60° from the longitudinal axis is provided between inner sections 352 and 354. A step transition is provided between inner sections 354 and 356, the step 384 serving as a land for one end of a poppet spring 302, which abuts against, on an opposite end, secondary poppet seat 303.

Secondary poppet seat 303 is configured for insertion into a rear or distal end 385 of main poppet seat 308, as shown in FIG. 4 and FIGS. 7a-7b. A front section 386 of secondary poppet seat 303 is configured for such insertion into a rear end 385 of main poppet seat 308. Front section 386 has a diameter of about 7.61 mm and a length of about 2.79 mm and terminates at a shoulder 387 having a diameter of about 9.22 mm, as shown in FIG. 8a. Upon insertion of secondary poppet seat 303 front section 386 into the rear 385 of main poppet seat 308, shoulder 387 abuts against a rear face of main poppet seat 308 to seal the periphery of main poppet seat 308, as shown in FIG. 4. A rear section 388 of secondary poppet seat 303 has a diameter of about 3.96 mm and a length of about 5.54 mm.

Figure 8C:
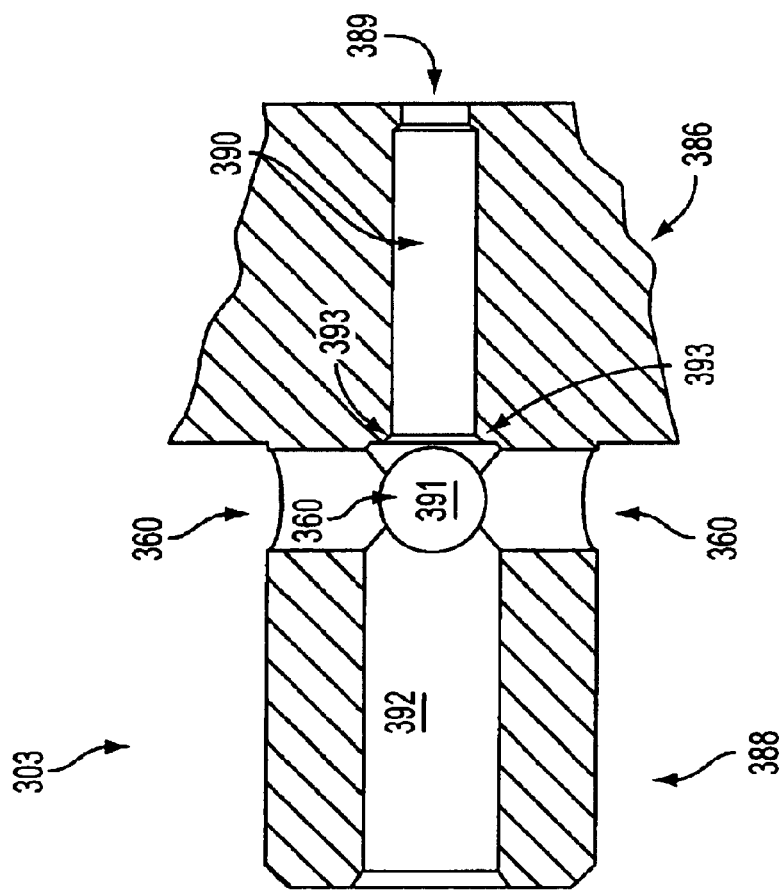
FIGS. 8a–8c show, respectively, a cross-sectional view of a poppet seat, a view of the poppet seat, and an enlarged cross-sectional view of a portion of the poppet seat.
Figure 8A:
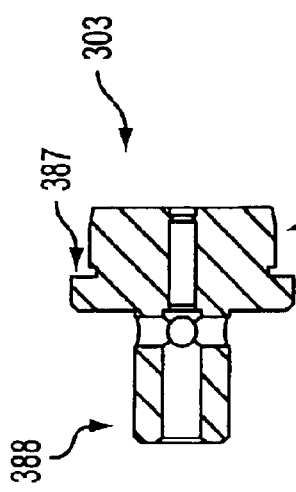
Figure 8B:
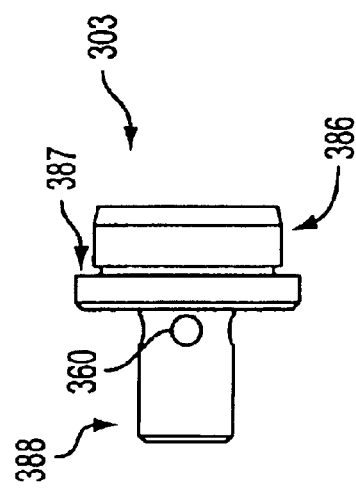

As shown in FIGS. 8a and 8c, the front section 386 of secondary poppet seat 303 includes a small bore 390 having a diameter of about 1.016 mm and the rear section 388 of the secondary poppet seat 303 includes a large bore 392 having a diameter of about 1.57 mm, the bores 390, 392 being coaxially disposed about a longitudinal axis of the IPR 300. Secondary poppet seat 303 rear section 388 includes four 1.3 mm diameter holes 360 spaced apart from one another about a circumference of the rear section 388 such that a center of each hole 360 is disposed about 0.90 mm from a rear face of secondary poppet seat 303 shoulder 387. The holes 360 extend to a center of secondary poppet seat 303. The confluence of bores 390, 392 and holes 360 form a poppet seat pilot control chamber 391 into which an operating fluid is passed and controlled. An inner edge of the small bore 390 is chamfered, preferably at a 45° angle, and hardened, such as case hardening to a depth of 0.2-0.3 mm, to form a pin poppet seat. An orifice 389 having a diameter of about 0.8 mm is provided at a forward portion of small bore 390.

The orifice 389 is advantageously incorporated into secondary poppet seat 303, as shown in FIG. 8(c). In an alternate configuration, a disc orifice (not shown) of a predetermined orifice diameter different than that of the large bore may be provided between the secondary poppet seat 303, described below, and the front end 386 of poppet spring 302 to enhance flexibility while still permitting tailoring of flow through main poppet 307 and secondary poppet seat 303.

Figure 9:
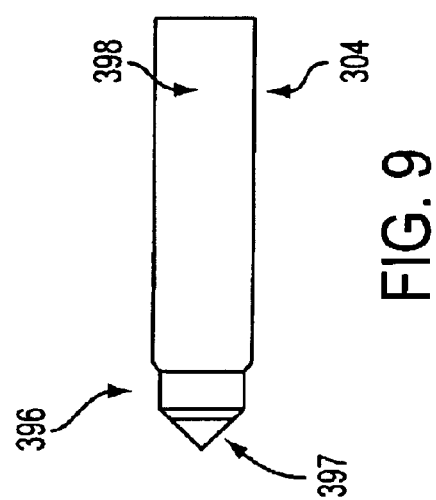
FIG. 9 shows a poppet pin.

As shown in FIGS. 4 and 9 pin poppet 304 is inserted into secondary poppet seat 303 rear end 388. Pin poppet 304 comprises a head portion 396, having a base diameter of about 1.3 mm and a conical tip portion 397, and a shaft portion 398 having a diameter of about 1.55 mm, with a chamfered or smooth transition therebetween. Pin poppet 304 is preferably made from a SAE E52100 steel or equivalent. Conical tip portion 397 defines an overall tip angle of about 90° and is configured to matingly seat within the pin poppet 304 seat face 393 defined within secondary poppet seat 303 at a position along the conical tip portion 397 where the diameters are substantially equal. The overall length of pin poppet 304 is, in the embodiment, 6.91 mm, wherein the shaft portion 398 is about 5.66 mm and the head portion is about 1.25 mm.

A front end 400 of IPR 300 includes an internal or external filter element cooperatively assembled with sealing means, as shown in FIGS. 4, 5a and 11a–11b, to protect the valve from debris, particularly start-up debris. As illustrated in FIG. 4, an external filter element 318 is provided on main poppet seat 308 filter element receiving section 401 with O-ring 405 and a back-up O-ring 317 disposed rearwardly of filter element 318. Filter element 318 is, in one aspect, a 304 stainless steel or equivalent mesh with 250 micron openings and 125 micron wire diameter having a filter screen push out force greater than about 3 Newtons.

Figure 5B:
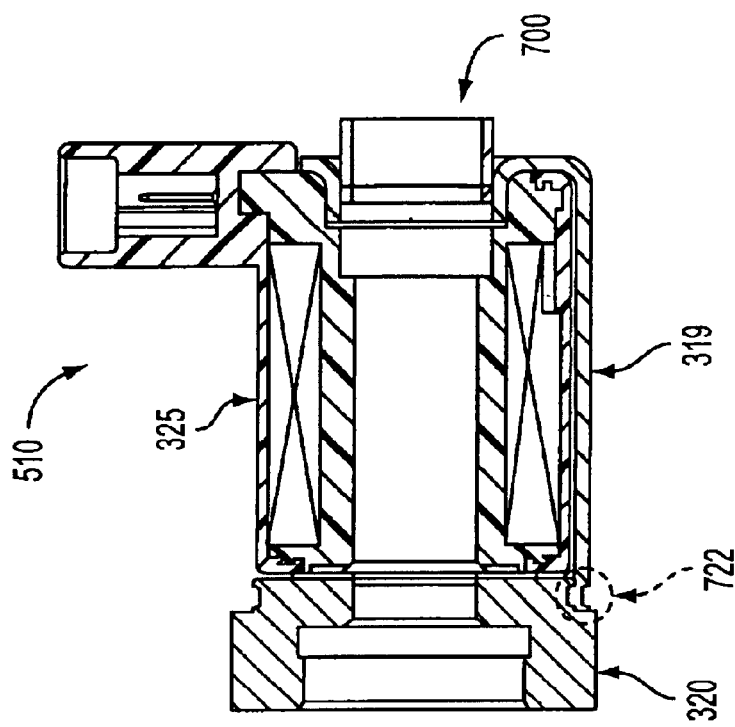
FIG. 5b shows a cross-sectional view of a coil assembly.
Figure 5A:
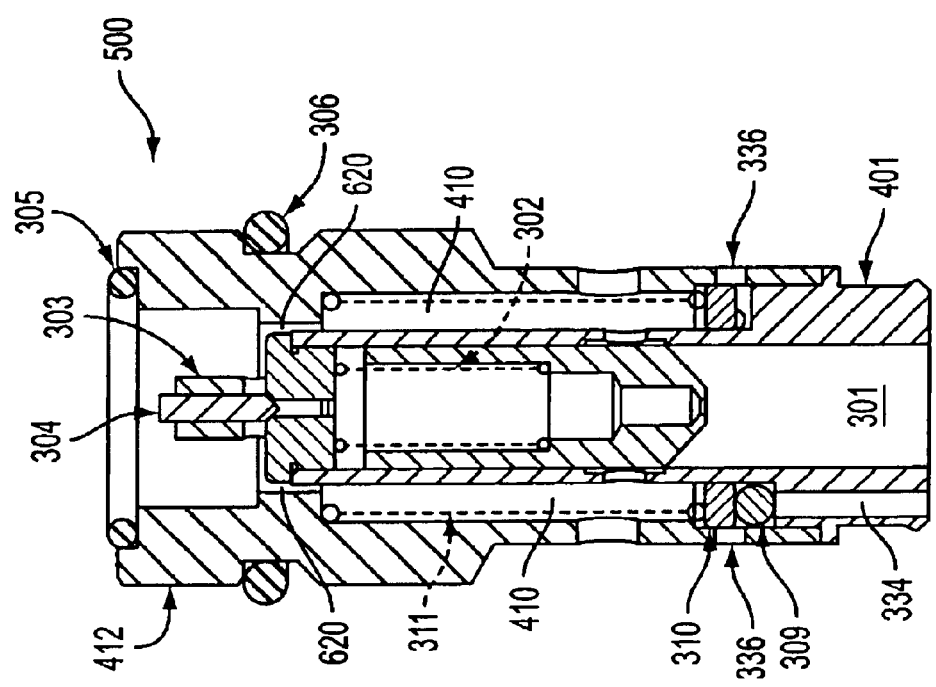
FIG. 5a shows a cross-sectional view of a cartridge assembly.

IPR 300 may itself be optionally configured to provide a pressure relief function, a feature conventionally dedicated to the high pressure pump, such as Rexroth or Sheppard pumps, known to those skilled in the art. Functionally, it is desirable for the cracking pressure to be about 31.0 MPa with a maximum operating pressure of about 37.8 MPa and a maximum flow rate of about 30.0 L/min. A suitable design life should include, at a minimum, about 10,000 cycles. The pressure relief function may be accomplished, in one aspect, by one or more ball relief valves, comprising ball 309 and relief washer 310 disposed within an annular space 410 formed between main poppet seat 308 and valve body 312, as shown in FIGS. 4 and 5a.

Relief washer 310 is made from a SAE 41L40 steel, or equivalent. As shown in FIG. 4, a channel 334 is formed in main poppet seat 308 to face IPR 300 inlet 301. Below a predetermined cracking pressure, ball 309 is seated against a rear side of channel 334 by relief spring 311, which biases relief washer 310 against ball 309 and urges ball 309 against channel 334. Relief spring 311 is housed in annular space 410. At a predetermined cracking pressure, channel 334 pressure overcomes the bias of relief spring 311 and displaces ball 309 and relief washer 310 rearwardly a slight amount to expose a vent opening 336, which vents the excess pressure.

Three channels 334 and balls 309 are disposed radially 120° apart under a predetermined spring preload. Relief washer 310 has an outer diameter of about 14.86 mm and an inner diameter of about 9.52 mm. The inner diameter is appropriately hardened, surfaced and chamfered to enable sliding movement relative to the valve body 312 and main poppet seat 308 without galling, fouling or sticking. Eight vent openings 336 having a diameter of approximately 1.77 mm are disposed about a circumference of valve body 312. Each channel 334 has a diameter of about 1.4 mm and each ball 309 has a diameter of about 2.38 mm, wherein annular space 410 within which the ball 309 and relief washer 310 are disposed has a diameter or depth of about 2.50 mm. As configured, the ball relief valve cracks at 4500 psi and develops full flow of about 30 LPM at 5500 psi to protect components in the oil rail. Once the pressure is reduced below about 4500 psi, relief spring 311 bias the relief washer 310 forwardly past the vent openings 336 to close the openings and seat ball 309 against channel 334.

Main poppet seat 308 also comprises four seat drain openings 332 having a diameter of approximately 2.49 mm disposed about a circumference of main poppet seat 308, as shown in FIGS. 7a and 7b. Seat drain openings 332 are centered about 19.95 mm from a rear or distal end 385 of main poppet seat 308. As shown in FIGS. 12a–12c, valve body 312 includes similar valve body drain openings 342. In the embodiment, four valve body drain openings 342 having a diameter of approximately 3.57 mm are disposed about a circumference of valve body 312. Valve body drain openings 342 are centered about 29.2 mm from a rear or distal end 412 of valve body 312. In an equilibrium or start-up state, poppet spring 302 biases the front end outer edges of poppet 307, as shown in FIG. 4, to a position slightly forward of seat drain openings 332 to stop drainage through seat drain openings 332 and valve body drain openings 342.

As shown in FIG. 4, main poppet seat 308 is disposed within valve body 312, a rear end 412 of valve body 312 being disposed within hex cap 320 through a conventional connection means such as, but not limited to threads 331 for a threaded connection or appropriate members (not shown) for a snap-fit connection. A valve body O-ring 306 is provided between hex cap 320 and valve body 312 to seal the connection between the two members and also to serve as a valve body barrier seal to the environment, in combination with a rubber protective cap (not shown) having an inside diameter substantially equal to that of the outer diameter of the O-ring inserted over the valve body, prior to installation of the IPR 300 in its intended environment. To facilitate installation of IPR 300 into a pump or pump flow pathway, external threads 330 are provided on valve body 312, as shown in FIGS. 12a–12c. Alternatively, other means of mechanical connection may be employed as well such as, but not limited to, snap-fit (snap to fit) connecting elements, such as an Aeroquip snap to connect feature. Snap to fit connection means permit quick disconnect to simplify and speed installation and to facilitate adjustment and testing of valves during production.

Figure 10:
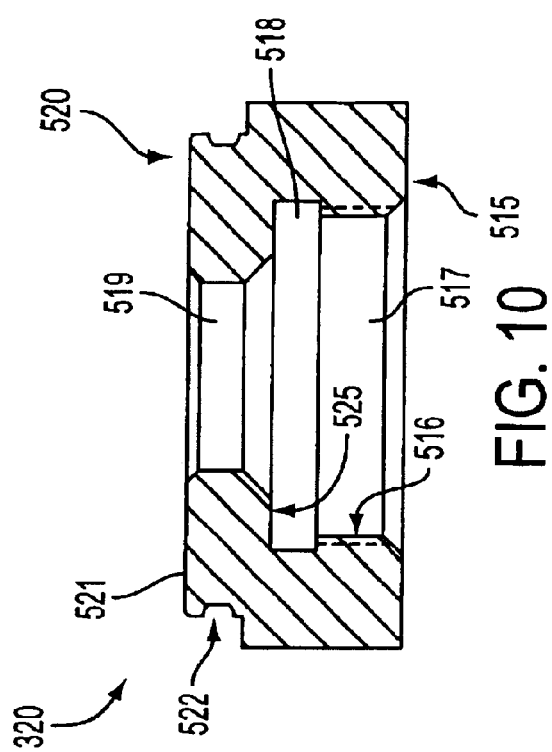
FIG. 10 shows a hex cap.

Hex cap 320 is configured to permit connection of the cartridge assembly 500, shown in FIG. 5(a), to the coil assembly 510, shown in FIG. 5(b) and further described below. Hex cap 320 comprises, in one aspect, a SAE 12L14 steel or equivalent. As shown in FIG. 6, valve body 312 is connected to hex cap 320 through a threaded connection. FIG. 10 illustrates one aspect of hex cap 320. A front end 515 of hex cap 320 comprises a hex cap front bore 517 having a diameter and thread configuration commensurate with that of the corresponding threads 331 provided on the outside of rear portion 412 of valve body 312. For example, the base diameter from thread crest to opposing thread crest is about 20.0 mm. The depth of hex cap 320 threaded portion 516 is preferably above 4 mm and is more preferably about 5.5 mm. This hex cap front bore opens up to a larger diameter hex cap central bore 518 having a diameter of 22.4 mm.

A rear end 520 of hex cap 320 protrudes rearwardly about 3.57 mm from a rear of the front end 515 and terminates in a rear face 521. A toroid-shaped recession 522 is formed about an outer edge of the rear end 520 of hex cap 320 starting about 0.5 mm from a rear of the hex portion of hex cap 320. The toroid-shaped recession 522 has a diameter of about 2.0 mm in this embodiment and is configured to receive, upon crimping or other joining process, a corresponding section 722 of housing 319, as shown in FIG. 5(b). The rear end 520 of hex cap 320 has a hex cap rear bore 519 having an inner diameter of about 12.05 mm, preferably chamfered on both sides, coaxial with the hex cap front 517 and central 518 bores. A transition in diameters between the hex cap central bore 518 and the hex cap rear bore 519 defines a shoulder 525.

Figure 13B:
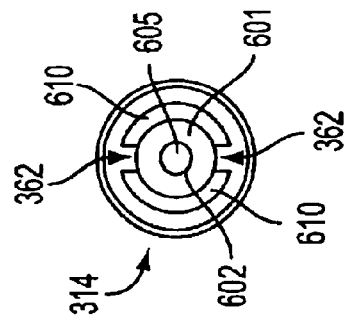
FIGS. 13a–13b show a cross-sectional and a front view of a stator.

FIG. 4 shows a tube 327 is inserted into hex cap 320 through a front end 515 thereof so as to extend rearwardly through hex cap rear bore 519. As shown in FIGS. 4 and 13(c), tube 327 includes a flange or shoulder portion 530 configured to engage the hex cap 320 shoulder 525 depicted in FIG. 10. In the embodiment, the tube 327 is about 1.0 mm thick with an outer diameter of about 11.85 mm and an inner diameter of about 9.83 mm. Flange 530 is formed with an inner radius of 1.5 mm and an outer radius of 2.1 mm and has an outer diameter of 19.5 mm. Tube 327 is made, in one aspect, by a 305 stainless steel or equivalent. As shown in FIG. 4, a rear face of valve body 312 abuts against the tube 327 shoulder portion 530 and an O-ring is provided therebetween in an annular gap 535 having a depth of about 1.19 mm in the rear face of valve body 312 rear end 412.

Figure 13A:
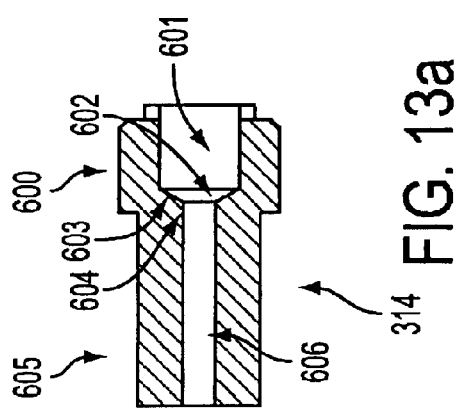
Figure 13C:
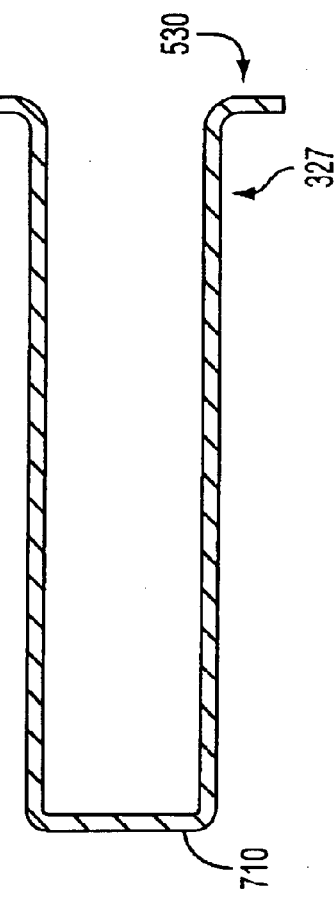
FIG. 13c shows a cross-sectional view of a tube.

Stator 314 is disposed partially within tube 327 and partially within an annular cavity in a rear end portion 412 of valve body 312, as shown in FIGS. 4, 12(a) and 13(a). Stator 314, shown in cross-section in FIG. 13(a), is preferably a SAE 12L14 steel and is about 24.66 mm long with a front end 600 outer diameter of about 12.53 mm and a rear end 605 outer diameter of about 9.72 mm, as shown in FIG. 13(a). A rear stator bore 606 possesses an inner diameter of about 2.46 mm and a depth or length of about 15.92 mm. A front stator bore 601 possesses an inner diameter of about 6.35 mm and a depth of about 6.9 mm. A dual-angle chamfered transition 602 is provided between the front end stator bore 601 and the rear end stator bore 605. The first chamfered transition 603, adjacent the front stator bore 601, has an angle of about ±60° to the longitudinal axis of the stator 314. The second chamfered transition 604, adjacent the rear stator bore 606, has a depth of about 0.8 mm and has an angle of about ±10° to the longitudinal axis of stator 314. As shown in FIG. 13(b), a split boss 610 having a channel portion 362 is provided at the forward-most face of stator 14. The channel portion 362 has a width of about 2.03 mm, a depth of about 1.20 mm, and is provided on opposite sides of the stator 314 longitudinal axis. In the assembled position, such as shown in FIG. 4, channel portions 362 are substantially longitudinally aligned with poppet seat holes 360.

As described in more detail below, arrangement of the stator 314 channel portions 362 and poppet seat holes 360 permits, upon rearward translation of pin poppet 304, pressurized fluid, such as oil, to flow from main poppet chamber 351 through the small bore 390 of secondary poppet seat 303, holes 360, and channel portions 362 to an annular passage 620 defined between an inner face of valve body 312 and outer faces of secondary poppet seat 303 and main poppet seat 308, as shown in FIG. 5(a), into the annular space 410 and out valve body drain openings 342.

It bears emphasizing that the above-described cartridge assembly, as shown in FIG. 5(a), generally comprising valve body 312, main poppet seat 308, poppet 307, and secondary poppet seat 303, is a merely one embodiment of a device that may be advantageously combined with the hereindisclosed electromagnetic device adjustment features. Other embodiments of devices that may be advantageously combined with the hereindisclosed electromagnetic device adjustment features include, but are not limited to, hydraulic valves such as 2-way normally open or normally closed poppet valves; 2,3, or 4 way spool valves, proportional pressure regulating valves, and proportional flow valves, as generally known to those skilled in the art. Still further embodiments of devices that may be advantageously combined with the hereindisclosed electromagnetic device adjustment features include, but are not limited to, pneumatic valves such as normally open or normally closed pneumatic valves and pneumatic proportional valves. Additional embodiments of devices that may be advantageously combined with the hereindisclosed electromagnetic device adjustment features include mechanical devices such as on-off type mechanical actuators and proportional actuators.

A pin 313 translates within the rear stator bore 606 and is substantially co-linear to the pin poppet 304, such as shown in FIG. 4. Pin 313 is preferably made from a UNS S30300 stainless steel or equivalent and has a diameter of about 2.36 mm with a length of about 18.665 mm. 45° chamfering is provided at each end. The length of pin 313 may be easily varied to accommodate a variety of stroke lengths and performance requirements. Presently utilized lengths include, but are not limited to, 18.665 mm, 18.69 mm, 18.715 mm, 18.74 mm, 18.765 mm, 18.79 mm, and 18.815 mm. In other words, pin 313 is longer than the rear stator bore 606 within which pin 313 predominantly travels. A terminal portion of the stroke length in either direction extends slightly beyond the end of the rear stator bore 606 and extends into the front stator bore 601, on a forward stroke, and into the armature bearing portion of the tube 327.

FIG. 4 shows an armature bearing portion of the tube 327, defined as the portion of tube 327 not occupied by stator 314, and armature 326 configured for longitudinal transverse motion or reciprocation therein. Armature 326 is formed from a 12L14 steel or equivalent and has a main body 370 and an armature pin 372, such as shown in FIGS. 14(a)–14(b). FIGS. 14(a)–14(b) depict a stepped armature 326 comprising an armature main body 370 having a diameter of about 9.753 mm and a length of about 25.72 mm and an armature pin 372 having a diameter of about 2.00 mm and a length of about 5.08 mm. A bore 371 having a diameter of about 2.77 mm is provided through a length of main body 370 and extends, from a center position displaced about 2.67 mm from a center axis of armature pin 372, about 25.21 mm forwardly toward a front portion of the armature 326, stopping about 0.51 mm from the front face 373 of armature 326. A small orifice 374 having a diameter of about 0.508 mm is provided coaxial to the bore 371 and penetrates the 0.51 mm wall at the bottom of the bore to reach the front face 373 of armature 326. The small orifice 374 is preferably chamfered. The armature bearing portion of tube 327 is preferably filled with a small amount of an oil, such as but not limited to 0.721 grams of a 97437094 oil, prior to assembly. The armature bore 371 and small orifice 374 permit pressure equalization between the front and back side of armature substantially coincident with movement of armature 326.

Tube 327 may be provided with an inwardly-projecting dimple (or recession depending on ones perspective) provided coaxially with the central axis of the tube and IPR 300 so as to reduce or eliminate striction occurring between armature 326 and a bottom radius of tube 327. The degree of projection of this dimple into the armature 326 bearing cavity of tube 327 also determines a permissible range of travel of the armature 326 toward the closed end of the tube. A number of distributed dimple may be provided at the tube end to achieve the same result. Further, this optional dimple may be used in combination with optional armature pin 327 to provide additional means of control and calibration of the armature travel and valve performance.

FIG. 4 shows a bobbin 324, preferably made from a 70G33HSIL Zytel nylon or equivalent, provided about an outer circumference of tube 327. As further illustrated in FIGS. 15(a)–15(d), a forward flange 650 of bobbin 324 has an outermost diameter of 27.8 mm and an innermost diameter of 12.15 mm. A forward face 651 of the forward flange 650 is configured to engage and secure a forward section of overmold assembly 325, such as shown in FIG. 4 and as described later. A rear flange 660 is configured to engage and secure a rearward section of overmold assembly 325, such as shown in FIG. 4. This form of connection between bobbin 324, overmold assembly 325, hex cap 320 facilitates assembly, particularly in combination with the housing 319 is attached to hex cap 320 by crimping the front portion of housing 319 to hex cap 320 toroid-shaped recession 522, shown in FIG. 10. Overmold assembly 325 is formed from a Zytel nylon (70G13HSIL) or equivalent. The rear flange 660 of bobbin 324 bears electrical connectors 685, which provide electrical connection with other electrical components in a manner known to those skilled in the art. A detailed description thereof is accordingly omitted for brevity.

A forward face 661 of a rearward flange 660 of bobbin 324, also having an outermost diameter of about 27.8 mm, is longitudinally disposed about 25.97 mm from a corresponding rearward face 652 of the forward flange 650 by a cylindrical segment 670 having an outer diameter of about 17.10 mm. The forward face 661, rearward face 652, and cylindrical segment 670 together define a coil bearing cavity 672 therebetween having a depth of about 5.35 mm. As shown in FIG. 4, coils or wires 323 are wound around the cylindrical segment 670 within the confines of the forward face 661 and rearward face 652 to form a magnet or solenoid able to generate a magnetic field to longitudinally move or translate armature 326.

Figure 15B:
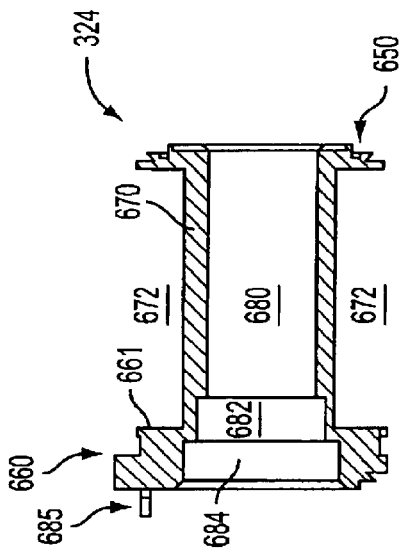
FIGS. 15b and 15d show a cross-sectional view and a front view of an bobbin.
Figure 15D:
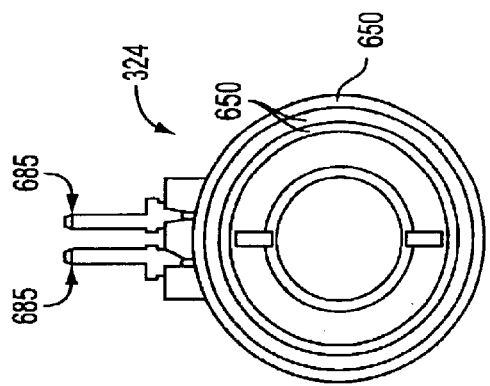
Figure 15A:
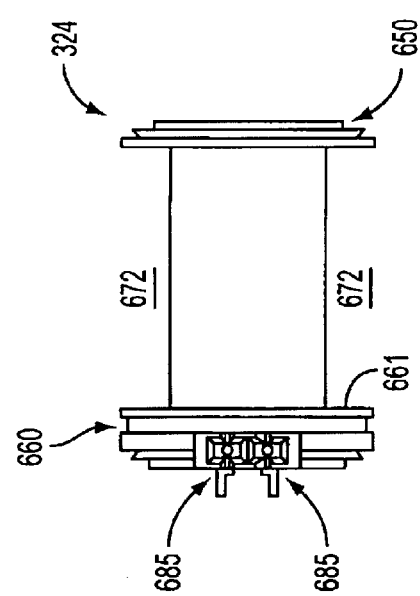
FIGS. 15a and 15c show a top view and a side view of an bobbin.
Figure 15C:
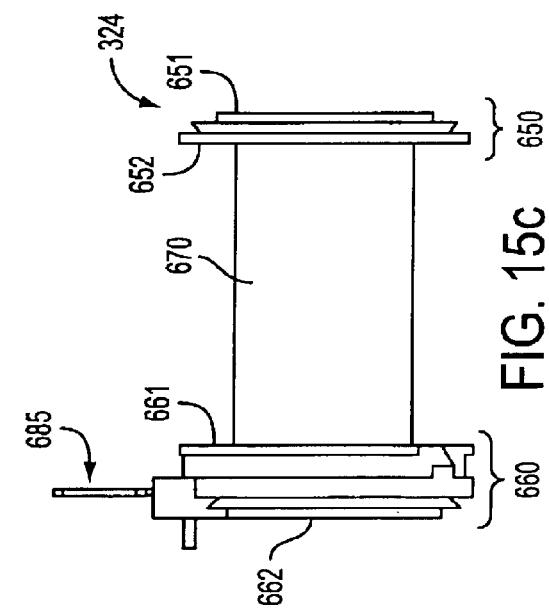

As shown in FIG. 15(b), bobbin 324 has a first inner diameter 680 of approximately 12.15 mm in the cylindrical segment 670 to receive the outer diameter of tube 327. Bobbin 324 also has a second inner diameter 682 and a third inner diameter 684 disposed at a rearward portion of the bobbin 324. Second inner diameter 682 is approximately 14.60 mm and is disposed, with a step transition, immediately adjacent a rear portion of first inner diameter 680. Third inner diameter 684 is approximately 17.40 mm and is disposed, with a step transition, immediately adjacent a rear portion of second inner diameter 682. The third inner diameter 684 terminates at a rear face 662 of bobbin 324 and is preferably chamfered at the rear face of the bobbin to a depth of 0.9 mm.

FIG. 4 shows a housing 319 provided to substantially circumscribe overmold assembly 325, with the exception of the terminal connection 322 and, optionally, a portion of the overmold assembly 325 reserved for affixation or impregnation of IPR identification information. Housing 319 is an AISI 1006 Cr steel or equivalent having a thickness of about 1.4 mm and a length of about 43.2 mm. A forward end of housing 319 is configured to be mechanically affixed to the torodial recession 522 at the rear end of hex cap 320, such as by crimping the housing 319 metal into the torodial recession. Rearward portions of housing 319 curve inwardly and then forwardly to form a cylindrical segment 690 having an inner diameter of about 14.30 mm configured to engage a rearward portion of tube 327.

Figure 16A:
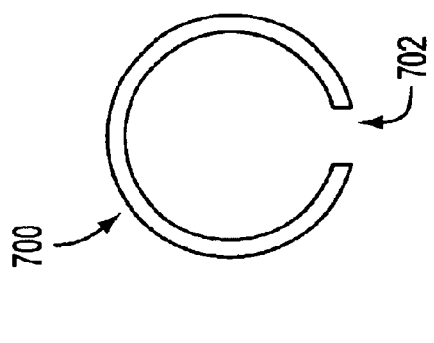
FIGS. 16a and 16b show front and top views of a flux ring.
Figure 16B:
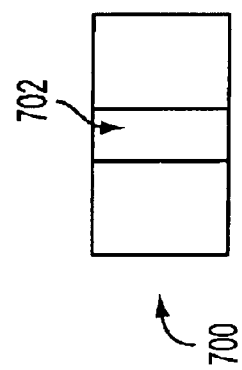

A flux ring 700, shown in FIGS. 16(a)–16(b), is inserted into a gap between cylindrical segment 690 of housing 319 and the closed end 710 of tube 327 by pressing the flux ring into the gap, as shown in FIG. 4. Flux ring 700 may be translated within a range of about −4.0 mm to +3.0 mm from the rearwardmost boundary or zero-point of cylindrical 690. Flux ring 700 is, in one aspect, a 1074 or 1075 grade high carbon spring steel. In the illustrated aspect of a flux ring 700, the flux ring has a diameter of about 15.00 mm and a thickness of about 8.0 mm. A gap 702 having a width of about 3.05 mm is provided in the flux ring 700. Upon insertion of the flux ring into the aforementioned gap between cylindrical segment 690 of housing 319 and the closed end 710 of tube 327, gap 702 decreases to accommodate any differences in diameter between the diameter of flux ring 700 and the gap between the cylindrical segment and the closed end of tube. Alternatively, the exterior or interior surface of the flux ring 700 could be provided with threads configured to mate with a corresponding thread provided on an external surface of tube 327 or an internal surface of cylindrical segment 690.

As depicted in the illustrated embodiment, the flux adjustment element is cylindrical and at least partially circumscribes tube 327. However, such configuration in not considered limiting and the flux adjustment element could comprise any magnetic material of any shape or configuration able to selectively attenuate a magnetic flux to an armature. For example, a plurality of flat plates or substantially flat plates individually, in groups, or collectively translatable into said gap between cylindrical segment 690 of housing 319 and the closed end 710 of tube 327, wherein the plates form or approach, in combination, a geometric shape such as, but not limited to, a square, rectangle, pentagon, hexagon, or octagon. In other embodiments the flux adjustment device (e.g., 700) may entirely circumscribe the tube 327 or may comprises one or more openings through a lateral surface thereof so as to selectively alter the magnetic permeability in a particular region of the flux adjustment device. Still further, the flux adjustment device 700 could comprise a plurality of sections, each of the sections possessing a different magnetic permeability.

In operation, upon start-up of an engine, pump outlet pressure enters the IPR 300 inlet 301 and a small amount of operating fluid (e.g., oil) flows into the main poppet chamber 351 through orifice inlet 382 (FIG. 6), passes through poppet seat orifice 389 and small bore 390 and into poppet seat pilot control chamber 391 (FIG. 8(c)). An ECM electronic signal energizes the solenoid coils 323 to generate a magnetic field which pushes armature 326 to the left, with respect to FIG. 4. Armature 326 exerts a force on push pin 313 and translates push pin 313 to the left, as well. Push pin 313 in turn abuts against and pushes poppet pin 304 to the left until the conical tip portion 397 is seated against poppet pin seat (pilot orifice) 393. Since seating of poppet pin 304 against seat 393 prevents flow out of small bore 390, the pressure in the main poppet chamber increases.

The combination of a force provided by main poppet spring 302 and main poppet chamber 351 pressure holds the main poppet to the left, as shown in FIG. 4, thereby closing off the seat orifices 332. Consequently, all oil is maintained in the pressure rail until the desired starting pressure is reached. As a point of reference, approximately 600 psi of oil pressure is required to start a relatively warm Navistar V106/V110 engine, whereas if the engine is cold (coolant temperature below 0° C.), higher oil pressure is required.

Once the engine starts, the ECM sends a signal to the IPR corresponding to a desired rail pressure, determined in a manner known to those skilled in the art, based upon input from a plurality of sensors, such as an injection control pressure sensor monitoring actual oil rail pressure. The ECM monitors the actual rail pressure and compares and adjusts the signal to the IPR 300 to obtain the desired rail pressure.

A description of the flow of operating fluid (e.g., oil) through IPR 300 during engine operation follows. Pump outlet pressure enters the front end of IPR 300 through external filter 318 and IPR inlet 301, where a small amount of oil flows into the main poppet chamber 351. The pressure in the main poppet chamber 351 is controlled by adjusting the position of the pin poppet 304 relative to the pin poppet seat or pilot orifice 393. Withdrawal of the pin poppet 304 from the pin poppet seat 393 would permit bleed off of oil from main poppet chamber 351. The position of pin poppet 304 is controlled, ultimately, by the strength of the magnet field produced by coils 323 as a result of an electrical signal or signals from the ECM. The main poppet 307 responds to pressure changes in the main poppet chamber 351 caused by bleed off into poppet seat pilot control chamber 391 and out of poppet seat large bore 392 (1.573 mm) and/or holes 360 (1.30 mm). Main poppet 307 accordingly changes positions to maintain a force balance between the right and left side of the main poppet. The main poppet 307 position determines how much of the area of the seat drain holes 332 that are open to the IRP 300 inlet 301 pressure. Naturally, this open area of drain holes 332 directly affects how much oil is bled off from the pump outlet and directly effects rail pressure. To provide rapid control of pump outlet pressure, main poppet 307 is held in a partially open position. ECR then varies signals to solenoid coils 323 to effect movement of armature 326, push pin 313, and poppet pin 304 to control pressure relief from poppet seat pilot control chamber 391, which affects the force balance on main poppet 307 causing main poppet 307 to move in a desired direction. The aforementioned IPR 300 arrangement allows practically infinitely variable control of pump outlet pressure between 290 psi to 4,000 psi. as shown generally by the gain curve depicted in FIG. 3.

Figure 17:
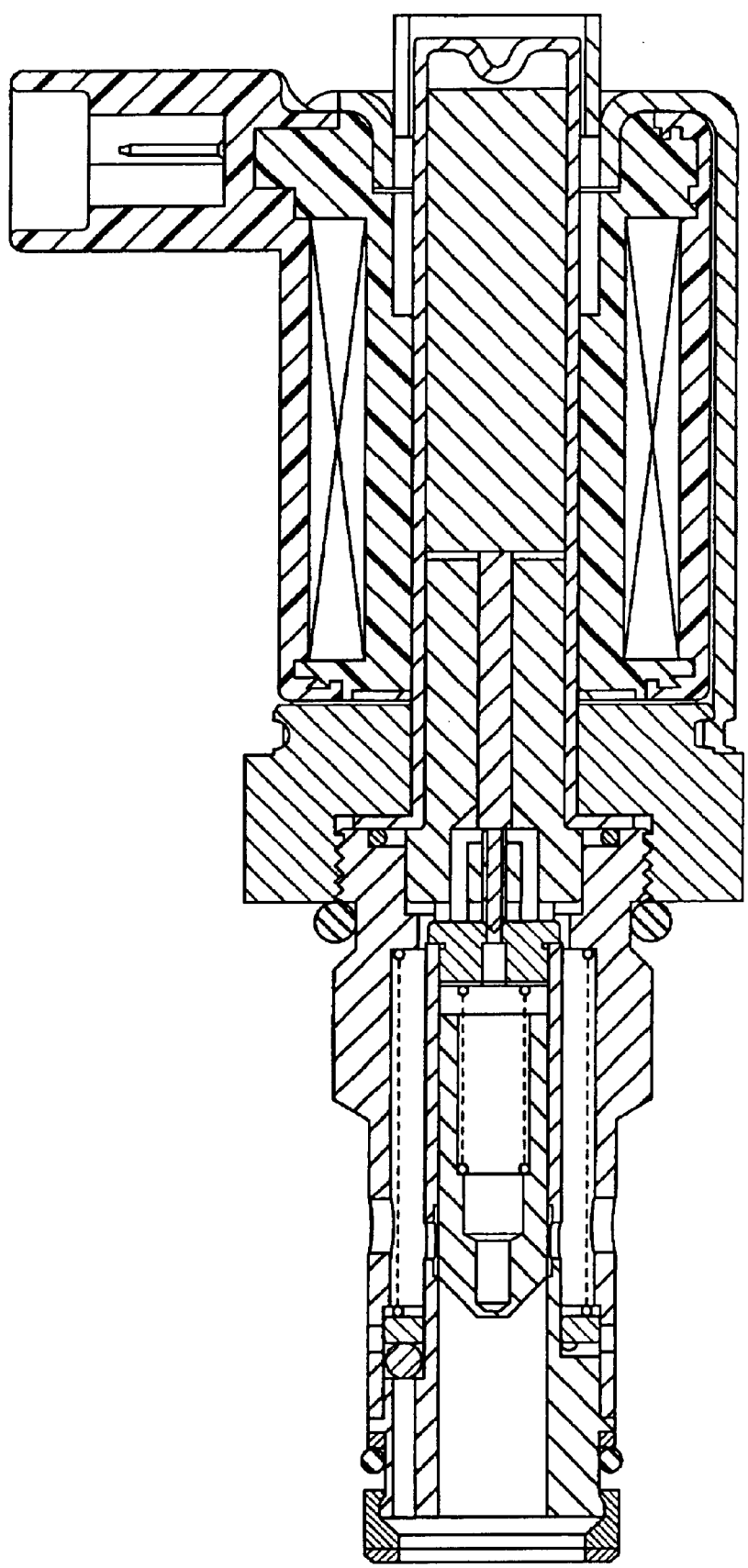
FIG. 17 shows an injector pressure regulator valve wherein the ring to armature overlap is illustrated.
Figure 18:
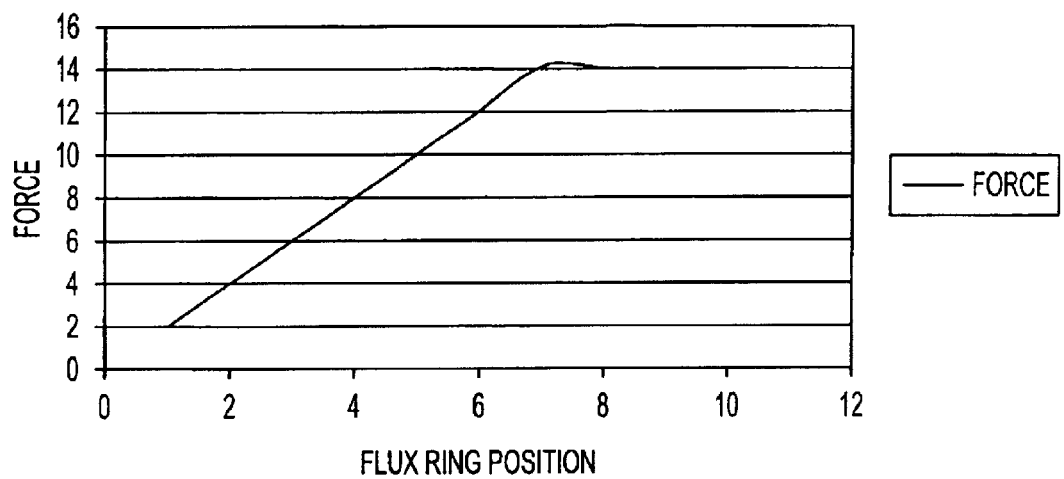
FIG. 18 shows an ideal curve of solenoid force versus flux ring position.

As noted above in relation to FIGS. 4 and 16(a)–16(b), a flux ring is inserted into a gap between cylindrical segment 690 of housing 319 and the closed end 710 of tube 327 and is translatable therein within a range of about −4.0 mm to +3.0 mm from the rearwardmost boundary or zero-point of cylindrical 690. This configuration provides a magnetic secondary air gap adjustment, wherein the flux ring 700 may be moved into and out of the magnetic path of the solenoid, as shown in FIG. 17, so as to respectively increase or decrease the amount of magnetic flux lines passing through the armature, flux ring and housing by means of the increased or decreased amount of steel in the magnetic circuit. This variability in magnetic flux provides a direct variability in the magnetic force generated by the solenoid, as shown in FIG. 18, which illustrates how the flux ring 700 to armature 326 overlap (i.e., flux ring position) affects the force output by armature 326.

Figure 1:
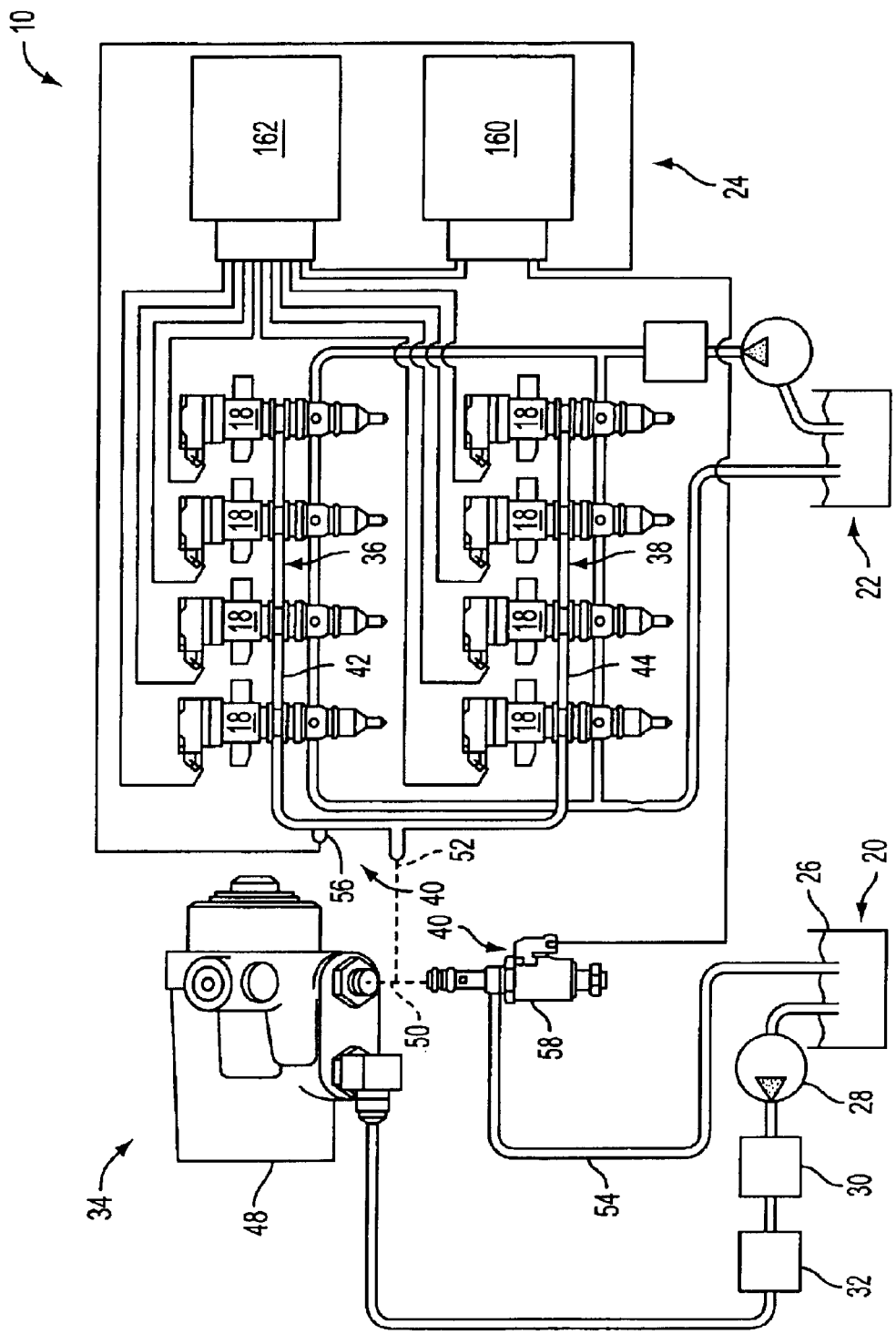
FIG. 1 shows an example of a conventional Hydraulically-actuated Electronically-controlled Unit Injector (HEUI) fuel system.
Figure 2:
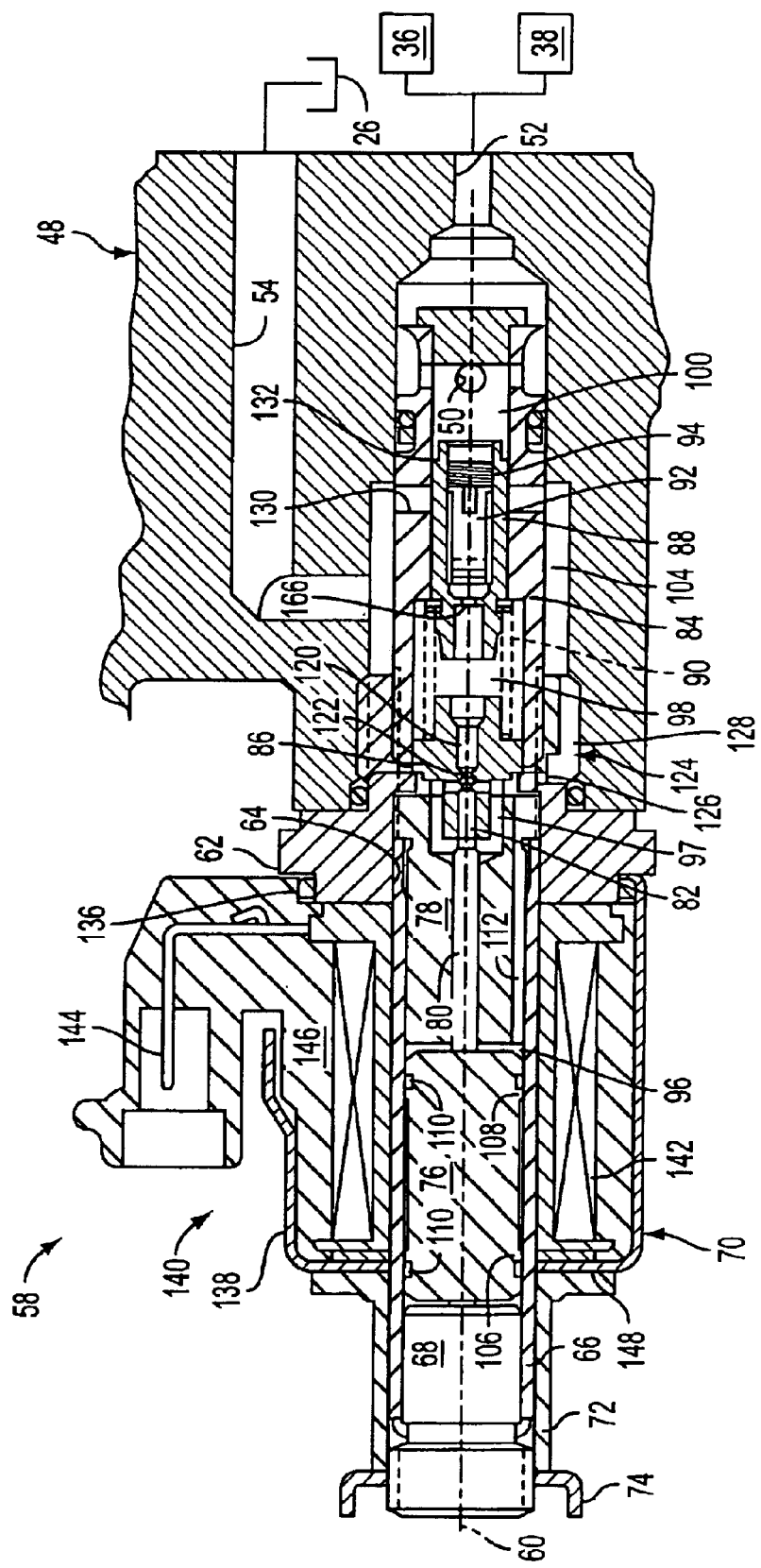
FIG. 2 shows a conventional rail pressure control valve (RPCV) used to control rail pressure in a system such as depicted in FIG. 1.
Figure 3:
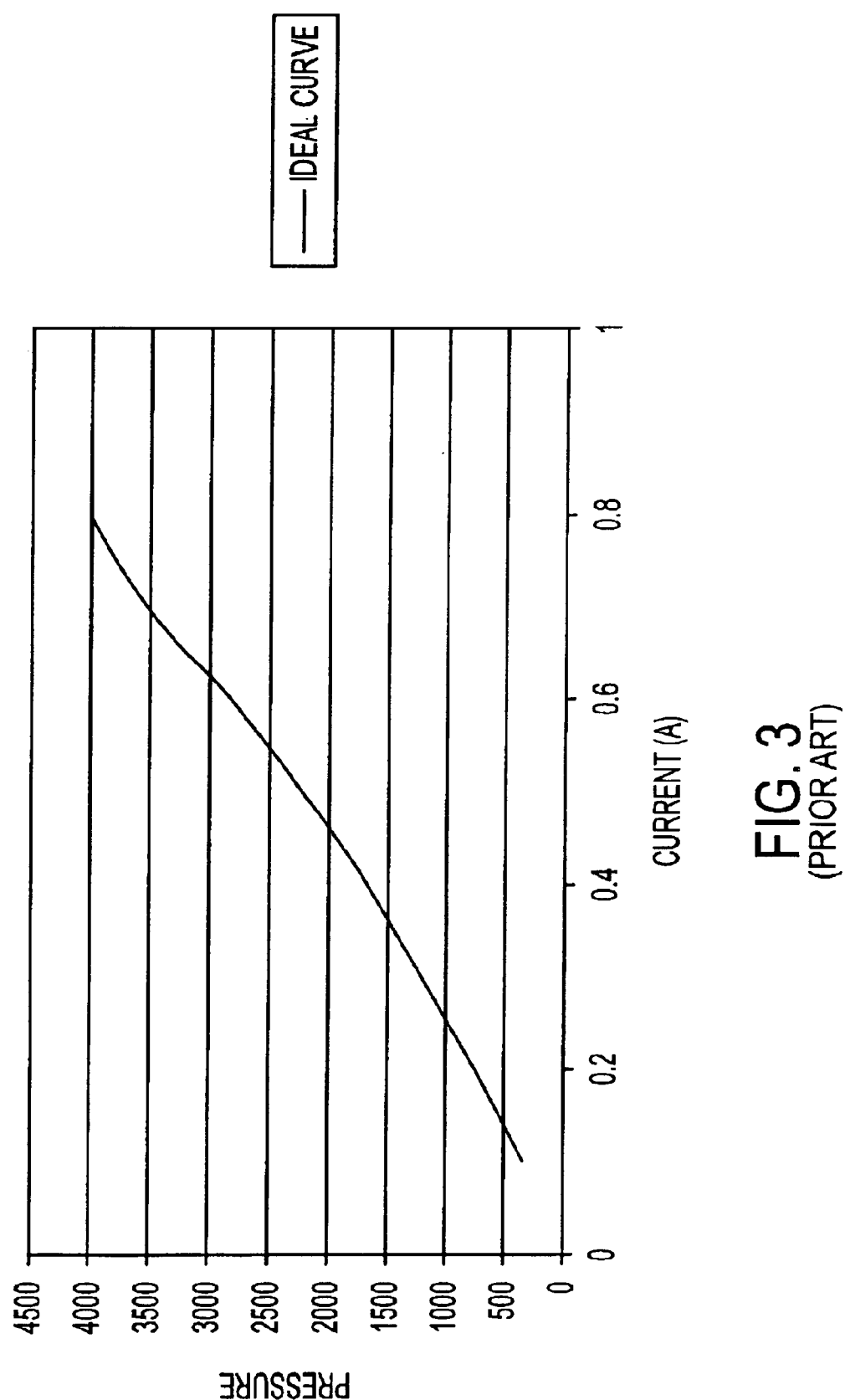
FIG. 3 shows an ideal pressure curve for a pressure control valve in accord with a specified input current.
Figure 19:
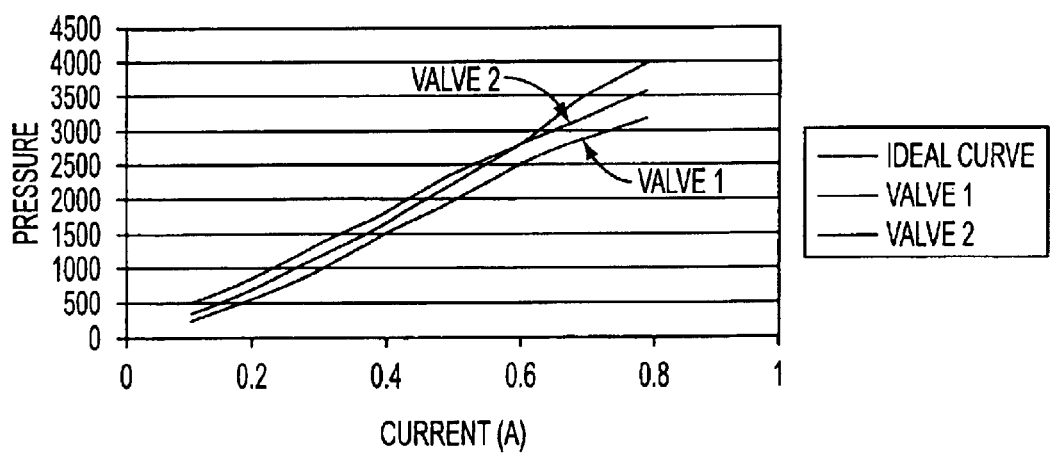
FIG. 19 shows curves of tested valves prior to adjustment of the valves utilizing the flux ring adjustment.

To illustrate the benefit of the aforementioned magnetic secondary air gap adjustment, FIG. 19 shows typical gain curves of valve 1 and valve 2 relative to the ideal curve, also shown in FIG. 3, prior to any adjustment to the valves. In typical valves, such as valve 1 and valve 2, the pressure at 0.8 amps can vary by ±18% or more. During production, IPRs 300 may be advantageously tested hydraulically under application of known currents to the solenoid coils 323. For example, the ideal curve dictates that a valve receiving 0.8 amps should control pressure to 4000 psi. Before any adjustment, IPR valve 1 is shown, at 0.8 amps, to control pressure at about 3200 psi, which is about 20% below the ideal, as tested. IPR valve 2 is shown, at 0.8 amps, to control pressure at about 3600 psi, which is about 10% below the ideal.

In accord with the invention, flux ring 700 in each of valves 1 and 2 can then be selectively positioned to increase the flux ring to armature 326 overlap and thereby increase the magnetic flux passing through armature 326. This increased magnetic flux through armature 326 correspondingly increases the force and response of armature 326 and the associated push pin 313 and poppet pin 304. This improves performance of the main poppet 307 by means of enhanced control of the poppet pin 304 and poppet seat pilot control chamber 391 and, therefore, the forces balancing main poppet 307.

Figures 20, 21:
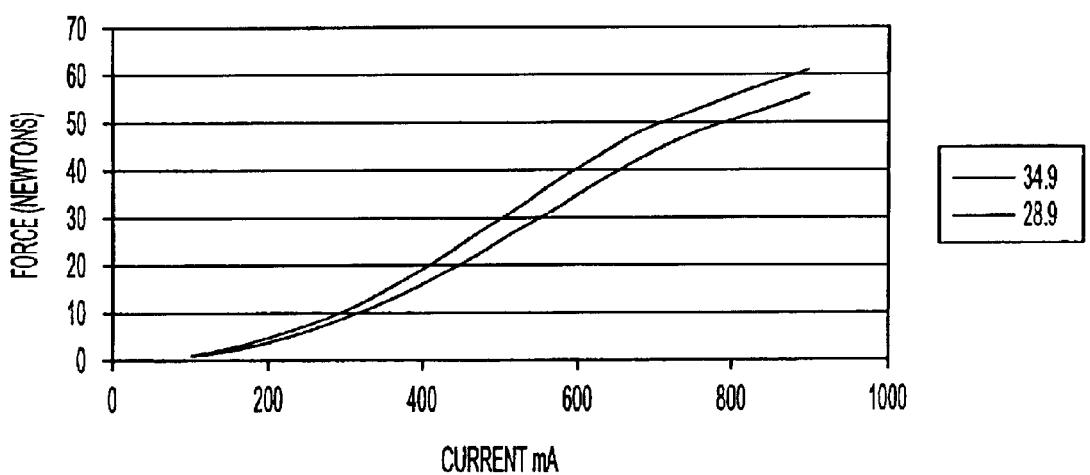
FIG. 20 shows data for a valve tested following adjustment of the valve utilizing the flux ring adjustment.
FIG. 21 graphs the data presented in FIG. 21 to illustrate the relation between force, current, and flux ring position.

FIGS. 20 and 21 present results of testing performed confirming the above noted effects. FIG. 20 shows, for a variety of flux ring positions ranging from 28.9 mm to 34.9 mm (as measured rearwardly from the rear face 521 of hex cap 320 to a leading or forward edge of flux ring 700; see FIGS. 4 and 10), the force (in Newtons) generated by the armature 326 for a variety of currents provided to the coils 323 ranging from 100 mA to 900 mA. FIG. 20 shows curves for the bounding runs for the test sample wherein the flux ring position was set to 28.9 mm (top curve) and 34.9 mm (bottom curve). These curves show that the force generated by armature 326, and associated components, increases as the flux ring 700 to armature 326 overlap increases (e.g., as the flux ring 700 is pushed further and further into the gap between cylindrical segment 690 of housing 319 and the closed end 710 of tube 327).

Figure 22:
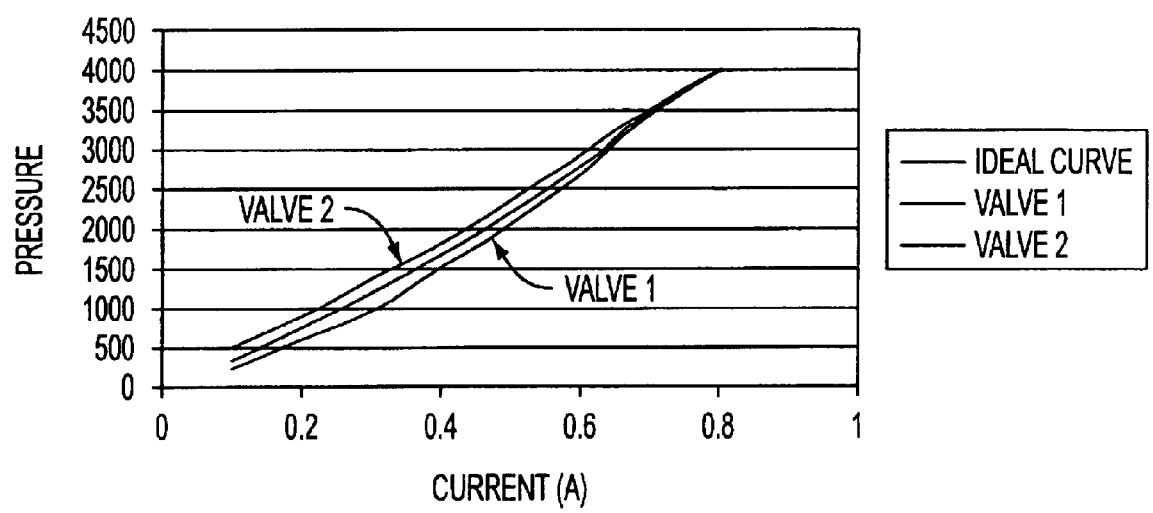
FIG. 22 shows curves of tested valves following adjustment of the valves at about 0.8 amps utilizing the flux ring adjustment.

In accord with the above, as shown in FIG. 22, the upper end of the valve's gain curve may be selectively adjusted to ensure that, at an upper end of the performance range, each valve will read approximately 4000 psi at 0.8 amps. Thus, every valve coming off the test stand can be configured to substantially match the ideal curve. Additionally, FIG. 22 shows that both valve 1 and valve 2 having improved performance not only at the specific value of 0.8 amps, but across a range of currents between about 0.5 amps and 0.8 amps. This advance thus improves valve accuracy and minimizes valve-to-valve variability. Moreover, if a high degree of accuracy is required at a different point in the curve to address a particular performance issue, the magnetic secondary air gap adjustment may be utilized to effect enhanced accuracy at a such specific point.

Furthermore, a second measure of adjustability, a back pressure adjustment feature, may advantageously be provided together with the aforementioned magnetic secondary air gap adjustment. Alternatively, the back pressure adjustment feature may be employed in isolation, just as the aforementioned magnetic secondary air gap adjustment may be employed in isolation.

Figure 23:
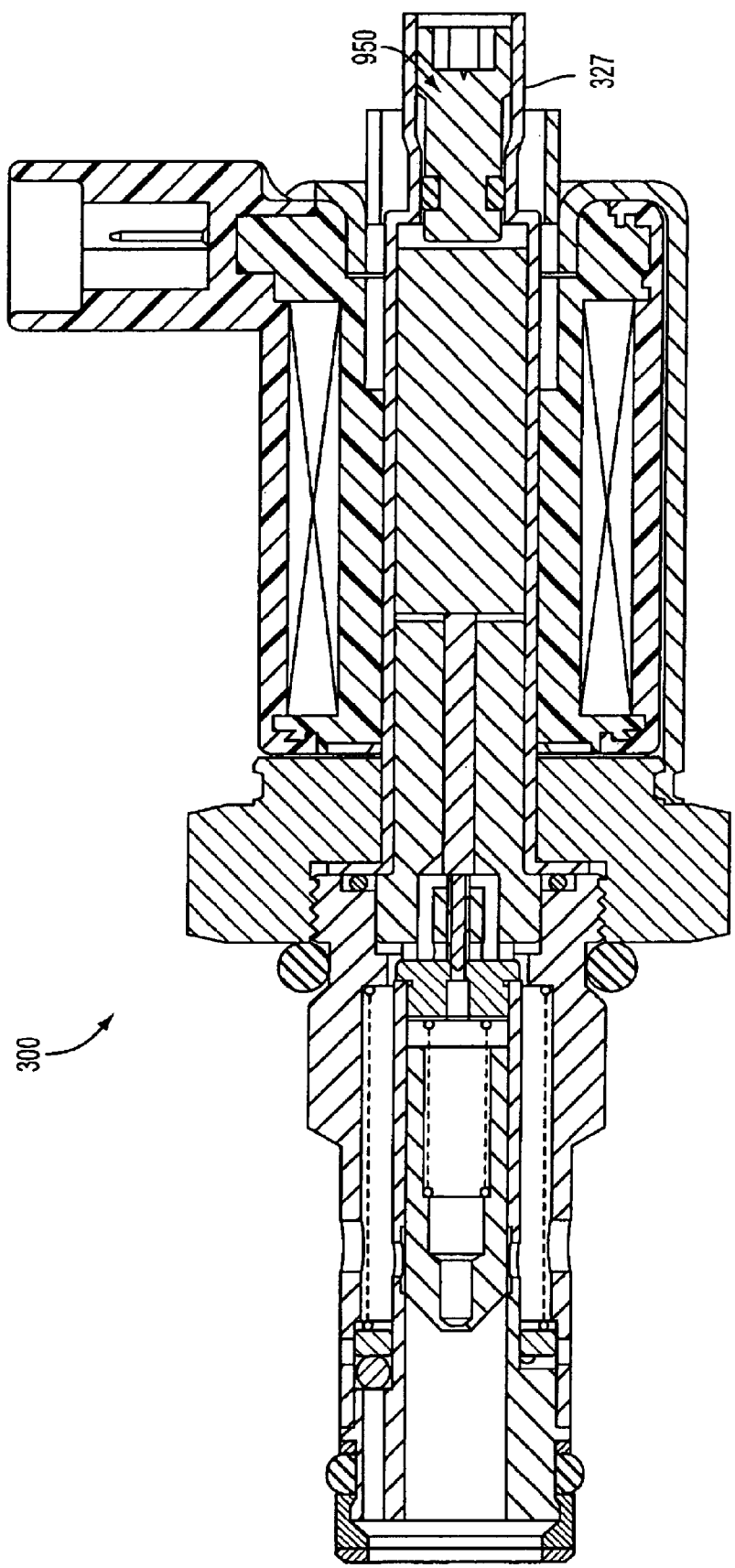
FIG. 23 shows an injector pressure regulator valve wherein the back pressure adjustment element(s) is (are) illustrated.

The back pressure adjustment feature addresses the lower end of the curves depicted in FIGS. 3, 19, 20, and 22. The back pressure adjustment concept utilizes an adjustment screw or equivalent selectively translatable member(s) 950 mounted in or adjacent a rear end of tube 327 so as to permit axial translation of the screw or other member 950 into the armature 326 bearing cavity of tube 327, as shown in FIG. 23. The selectively translatable member 950 could comprise any configuration of device configured to permit selective adjustment to provide a limit to distal or rearward limit to armature 326 travel. For example, a translatable pin could be used, wherein the pin is secured in place, such as by welding, bonding, or mechanical locking device. Selectively translatable member 950 may optionally be incorporated with the aforementioned flux adjustment element 700 into a single unit to faciliate assembly. Further, the adjustment screw or equivalent selectively translatable member(s) 950 (hereinafter "adjustment screw 950") should provide a suitable pressure boundary, if necessary, in accord with expected pressures in the armature bearing cavity of tube 327, such as by an O-ring 951, as shown in FIG. 23. Back pressure adjustment is effected by selectively translating the adjustment screw 950 into tube 327 so as to provide a limit to distal or rearward limit to armature 326 travel.

The back pressure adjustment addresses valve performance when the solenoid coils 323 are not energized. As shown in FIG. 4, an IPR poppet valve 300 comprises a main poppet 307, which controls the majority of the flow, and a pilot stage (e.g., 304) that controls the main poppet. When flow is introduced into the IPR valve 300, fluid passes through the main poppet orifice inlet 382, filling the main poppet chamber 351 and then passing through pilot orifice 389. When the IPR valve 300 is in an unenergized state, pilot orifice 389 is open. This reduces the pressure behind the main poppet 307 and allows the pilot stage or pin poppet 304 to open until the pressure behind the main poppet equalizes. This equalized steady-state pressure is the back-pressure of the IPR valve 300. For the aforementioned IPR 300 valve, the back pressure established between the major flow and the pilot flow is roughly 5 SLpm.

The back pressure adjustment feature allows the travel of the pilot orifice to be adjusted when the valve is being tested in an unenergized state. The adjustment screw 950 acts upon the end of armature 326, which in turn acts upon push pin 313 and pin poppet 304. Hence, the position of the adjustment screw 950 limits the backward travel of the armature 326, push pin 313, and correspondingly limits the backward travel of the pin 304 of secondary poppet seat 303 when the solenoid coils 323 are not energized. As already noted, pin poppet 304 regulates the flow out of the secondary poppet seat 303. By regulating the flow out of the secondary poppet seat 303, the pressure behind the main poppet 307 can be adjusted, and since equilibrium of the main poppet 307 has to be established to satisfy the functional test requirements, the main pressure of the IPR valve 300 is adjusted.

Figure 24:
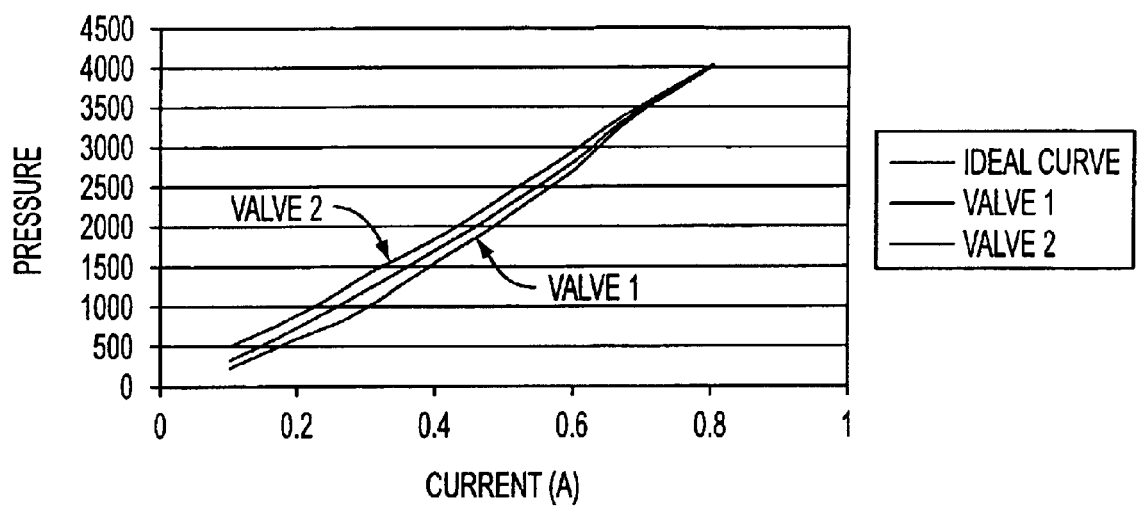
FIG. 24 shows curves of tested valves following adjustment of the valves at about 0.8 amps utilizing the flux ring adjustment, but before back pressure adjustment.

The back pressure adjustment is shown in FIGS. 23 and 24. After the aforementioned magnetic flux ring adjustment shown in FIG. 22, but before back pressure adjustment, FIG. 24 shows that the lower end of the gain curve is displaced from each of the tested valves. For example, the ideal curve dictates that a valve receiving about 0.1 amps should control pressure to about 400 psi. Before any adjustment, IPR valve 1 is shown, at about 0.1 amps, to control pressure at about 250 psi, which is more than 25% below the ideal. IPR valve 2 is shown, at about 0.1 amps, to control pressure at about 500 psi, which is about 25% over the ideal.

Figure 25:
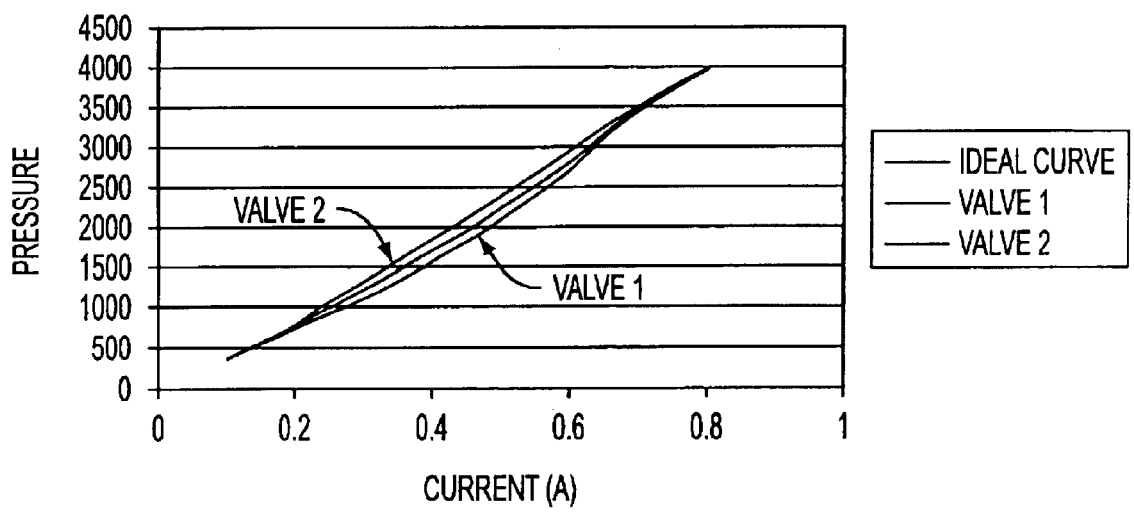
FIG. 25 shows curves of tested valves following adjustment of the valves at about 0.8 amps utilizing the flux ring adjustment and following back pressure adjustment.

In accord with the invention, the adjustment screw 950 may be selectively positioned during functional or performance testing to limit the backward travel of the armature 326, push pin 313, and correspondingly limit the backward travel of the pin 304 of secondary poppet seat 303 when the solenoid coils 323 are not energized. The IPR valves may be adjusted using conventional testing rigs providing the pressure source and the adjustment screw 950 adjusted until the desired back pressure is maintained at a lower end of the desired performance curve. As shown in FIG. 25, this adjustment normalizes both valves 1 and 2 with the ideal curve at the lower end of the gain curve, wherein valves 1 and 2 are shown operationally (i.e., under conditions of low pressure under coil 323 currents between about 0.1 amps to 0.2 amps) to substantially correspond to the ideal curve.

Utilization of solely the magnetic secondary air gap adjustment has demonstrated that it is possible to consistently provide a tolerance band of between about ±8% with respect to the ideal gain curve for the example of the embodiment presented above. Utilization of the magnetic secondary air gap adjustment in combination with the back-pressure adjustment feature permits realization of a tolerance band of between about ±3–5% with respect to the ideal gain curve for the example of the embodiment presented above.

The present invention can be practiced by employing conventional materials, methodology and equipment. In the previous description, numerous specific details are set forth to provide a thorough understanding of the invention by way of example, although many details of materials, equipment and methodology are not set forth herein so as not to unnecessarily obscure the present invention. However, it should be recognized that the present invention can be practiced without resorting to the details specifically set forth. Only one embodiment and but a few examples of its versatility are shown and described in the present disclosure and it is to be understood that the invention is capable of use in other combinations and environments and expressly contemplates modifications within the scope of the concepts expressed herein. As one example of such modification, the electromagnetic actuator may include two coils electrically connectable in a manner known to those skilled in the art to one or more circuits configured to provide a current to each of the coils to generate a magnetic field and magnetic flux two directions with an actuator configured to transmit a force imparted thereto by the magnetic flux output by the out of the electromagnetic actuator in both directions. Such forces transmitted by the actuator to a component outside of the electromagnetic actuator may be conveyed by any conventional means suitable to convey a force from the actuator. For example, a pin could be directly connected to the armature, the pin extending out of the electromagnetic actuator. The pin itself could comprise a valve, such as a needle valve, or could activate a switch or otherwise directly enable an event. The pin could also comprise a geared portion, such as a rack, to mate with a corresponding pinion as a gear set, the pinion configured to rotate another component, such as a ball valve.

What is claimed is:

1. An electromagnetic actuator, comprising:
   a tube having a proximal and a distal end;
   a coil disposed about said tube, said coil electrically connectable to a circuit configured to provide a current to said coil to generate a magnetic field and magnetic flux;
   a movable armature having a proximal and a distal end borne within said tube, said armature being at least partially circumscribed by said coil, said armature configured for magnetic coupling with said coil, said magnetic coupling urging said armature to move within said tube;
   said armature being configured to transmit a force imparted thereto by a magnetic flux output by said coil out of said electromagnetic actuator; and
   a flux adjustment element configured for movement within a magnetic flux output by said coil so as to increase a magnetic flux input to said armature upon movement of said flux adjustment element in a first direction and to decrease a magnetic flux input to said armature upon movement of said flux adjustment element in a second direction;
   wherein said flux adjustment element is externally disposed about said distal end of said tube adjacent said distal end of said armature.

2. An electromagnetic actuator in accord with claim 1, wherein said flux adjustment element is a cylindrical element configured to at least partially circumscribe said tube.

3. An electromagnetic actuator in accord with claim 1, wherein said flux adjustment element is a threaded cylindrical element and wherein said distal end of said tube comprises an external threaded portion, said threaded cylindrical element and said external threaded portion configured for mating engagement.

4. An electromagnetic actuator in accord with claim 1, further comprising: an armature travel adjustment element, wherein said armature travel adjustment element is disposed to enter a distal end of said tube and is configured for movement in an advancing direction toward a proximal end of said tube and a withdrawing direction away from said proximal end of said tube so as to correspondingly increase or decrease an armature travel within said tube.

5. An electromagnetic actuator in accord with claim 4, wherein said armature travel adjustment element comprises a threaded portion on an exterior portion thereof and wherein said distal end of said tube comprises an internal threaded portion, said armature travel adjustment element threaded portion and said tube internal threaded portion configured for mating engagement.

6. A pressure control valve comprising:
   an inlet for receiving an operating fluid from a pump;
   a movable valve element configured to selectively control a pressure of said operating fluid on a downstream side of said movable valve element responsive to a force imparted thereto by an electromagnetic actuator, an electromagnetic actuator, comprising:
   a tube having a proximal and a distal end;
   a coil disposed about said tube, said coil electrically connectable to a circuit configured to provide a current to said coil to generate a magnetic field and magnetic flux;
   a movable armature having a proximal and a distal end borne within said tube, said armature being at least partially circumscribed by said coil, said armature configured for magnetic coupling with said coil, said magnetic coupling urging said armature to move within said tube; said armature being configured to transmit a force imparted thereto by a magnetic flux output by said coil out of said electromagnetic actuator; and
   a flux adjustment element configured for movement within a magnetic flux output by said coil so as to increase a magnetic flux field input to said armature upon movement of said flux adjustment element in a first direction and to decrease a magnetic flux field input to said armature upon movement of said flux adjustment element in a second direction;
   wherein said flux adjustment element is externally disposed about said distal end of said tube adjacent said distal end of said armature.

7. A pressure control valve according to claim 6, wherein a force imparted to said armature by said magnetic flux output by said coil is output to one of a linear force transmission element and a rotational force transmission element.

8. A pressure control valve according to claim 7, wherein said linear force transmission element comprises a movable pin.

9. An electromagnetic actuator in accord with claim 8, wherein said flux adjustment element is a cylindrical element configured to at least partially circumscribe said tube.

10. An electromagnetic actuator in accord with claim 7, wherein said flux adjustment element is a threaded cylindrical element and wherein said distal end of said tube comprises an external threaded portion, said threaded cylindrical element and said external threaded portion configured for mating engagement.

11. An electromagnetic actuator in accord with claim 6, further comprising: an armature travel adjustment element, wherein said armature travel adjustment element is disposed to enter a distal end of said tube and is configured for movement in an advancing direction toward a proximal end of said tube and a withdrawing direction away from said proximal end of said tube so as to correspondingly increase or decrease an armature travel within said tube.

12. An electromagnetic actuator in accord with claim 11, wherein said armature travel adjustment element comprises a threaded portion on an exterior portion thereof and wherein said distal end of said tube comprises an internal threaded portion, said armature travel adjustment element threaded portion and said tube internal threaded portion configured for mating engagement.

13. An injector pressure regulator valve for controlling pressure to a hydraulic rail of a hydraulically actuated electronically controlled fuel injection system, the injector pressure regulator valve comprising:
   a main body, with a control cavity having:
      1) an inlet for receiving a working fluid output from a pump;
      2) an outlet for supplying the working fluid under regulated pressure to the hydraulic rail; and
      3) a drain port for allowing bleed-off of the working fluid from the control cavity to a sump;
   a main valve configured to slide within the control cavity and configured to selectively close and open the drain port of the control cavity;
   a control valve disposed downstream of said main valve for receiving the working fluid under pressure and for selectively passing, based on a position of said control valve relative to a respective control valve seat, said working fluid to said outlet, wherein said selective passing of the working fluid to said outlet by said control valve regulates a force balance between an upstream and a downstream side of said main valve, thereby urging said main valve in a selected direction relative to said drain port to adjust an upstream pressure thereto;
   an electromagnetic actuator for actuating the control valve in response to an electronic signal, the electromagnetic actuator comprising:
      a) a stator winding for receiving the electronic signal and generating a variable magnetic field and magnetic flux in response thereto, and
      b) a movable armature actuated by the magnetic field of the stator winding;
   an movable flux member interposed between the stator winding and the movable armature, positioning of which between the stator winding and the movable armature adjusts the flux coupling between the stator winding and the movable armature so as to set the responsiveness of the electromagnetic actuator to the electronic signal; and
   an armature travel adjustment member attached to a body member of the electromagnetic actuator for adjustably limiting movement of the armature in at least one direction.

14. A method for reducing manufacturing variability in an electromagnetic actuator comprising:
   proving an electromagnetic actuator comprising a tube having a proximal and a distal end;
   a coil disposed about said tube, said coil electrically connectable to a circuit configured to provide a current to said coil to generate a magnetic field and magnetic flux;
   a movable armature having a proximal and a distal end borne within said tube, said armature being at least partially circumscribed by said coil, said armature configured for magnetic coupling with said coil, said magnetic coupling urging said armature to move within said tube; said armature being configured to transmit a force imparted thereto by a magnetic flux output by said coil out of said electromagnetic actuator; and
   at least one of
      (1) an external flux adjustment element configured for movement within a magnetic flux output by said coil so as to increase a magnetic flux field input to said armature upon movement of said flux adjustment element in a first direction and to decrease a magnetic flux field input to said armature upon movement of said flux adjustment element in a second direction and
      (2) an external armature travel adjustment element disposed to enter a distal end of said tube and configured for movement in an advancing direction toward a proximal end of said tube and a withdrawing direction away from said proximal end of said tube so as to correspondingly increase or decrease an armature travel within said tube;
   attaching said electromagnetic actuator to a test stand configured to generate an output signal corresponding to a force generated by said armature based on a predetermined current input to said electromagnetic actuator coil;
   adjusting at least one of said external flux adjustment element and said external armature travel adjustment element responsive to said output signal to vary a corresponding magnetic flux field input to said armature and a range of travel permitted thereby so as to correspondingly increase or decrease said output signal until said output signal substantially corresponds to a predetermined output signal or falls within a range of predetermined output signals corresponding to said predetermined current input.

15. An electromagnetic actuator, comprising:
   a tube having a proximal and a distal end;
   a coil disposed about said tube, said coil electrically connectable to a circuit configured to provide a current to said coil to generate a magnetic field and magnetic flux;
   a movable armature having a proximal and a distal end borne within said tube, said armature being at least partially circumscribed by said coil, said armature configured for magnetic coupling with said coil, said magnetic coupling urging said armature to move within said tube;
   said armature being configured to transmit a force imparted thereto by a magnetic flux output by said coil out of said electromagnetic actuator; and
   a flux adjustment element configured for movement within a magnetic flux output by said coil so as to increase a magnetic flux input to said armature upon movement of said flux adjustment element in a first direction and to decrease a magnetic flux input to said armature upon movement of said flux adjustment element in a second direction;
   wherein said flux adjustment element is externally disposed about said distal end of said tube adjacent said distal end of said armature; and
   wherein said flux adjustment element is a cylindrical element configured to at least partially circumscribe said tube.

16. An electromagnetic actuator, comprising:
a tube having a proximal and a distal end;
a coil disposed about said tube, said coil electrically connectable to a circuit configured to provide a current to said coil to generate a magnetic field and magnetic flux;
a movable armature having a proximal and a distal end borne within said tube, said armature being at least partially circumscribed by said coil, said armature configured for magnetic coupling with said coil, said magnetic coupling urging said armature to move within said tube;
said armature being configured to transmit a force imparted thereto by a magnetic flux output by said coil out of said electromagnetic actuator;
a flux adjustment element configured for movement within a magnetic flux output by said coil so as to increase a magnetic flux input to said armature upon movement of said flux adjustment element In a first direction and to decrease a magnetic flux input to said armature upon movement of said flux adjustment element in a second direction;
wherein said flux adjustment element is externally disposed about said distal end of said tube adjacent said distal end of said armature; and
wherein said flux adjustment element is a threaded cylindrical element and wherein said distal end of said tube comprises an external threaded portion, said threaded cylindrical element and said external threaded portion configured for mating engagement.

17. An electromagnetic actuator, comprising:
a tube having a proximal and a distal end;
a coil disposed about said tube, said coil electrically connectable to a circuit configured to provide a current to said coil to generate a magnetic field and magnetic flux;
a movable armature having a proximal and a distal end borne within said tube, said armature being at least partially circumscribed by said coil, said armature configured for magnetic coupling with said coil, said magnetic coupling urging said armature to move within said tube;
said armature being configured to transmit a force imparted thereto by a magnetic flux output by said coil out of said electromagnetic actuator;
a flux adjustment element configured for movement within a magnetic flux output by said coil so as to increase a magnetic flux input to said armature upon movement of said flux adjustment element in a first direction and to decrease a magnetic flux input to said armature upon movement of said flux adjustment element in a second direction, wherein said flux adjustment element is externally disposed about said distal end of said tube adjacent said distal end of said armature;
an armature travel adjustment element, wherein said armature travel adjustment element is disposed to enter a distal end of said tube and is configured for movement in an advancing direction toward a proximal end of said tube and a withdrawing direction away from said proximal end of said tube so as to correspondingly increase or decrease an armature travel within said tube; and
wherein said armature travel adjustment element comprises a threaded portion on an exterior portion thereof and wherein said distal end of said tube comprises an internal threaded portion, said armature travel adjustment element threaded portion and said tube internal threaded portion configured for mating engagement.

18. A pressure control valve comprising:
an inlet for receiving an operating fluid from a pump;
a movable valve element configured to selectively control a pressure of said operating fluid on a downstream side of said movable valve element responsive to a force imparted thereto by an electromagnetic actuator, an electromagnetic actuator, comprising:
a tube having a proximal and a distal end;
a coil disposed about said tube, said coil electrically connectable to a circuit configured to provide a current to said coil to generate a magnetic field and magnetic flux;
a movable armature having a proximal and a distal end borne within said tube, said armature being at least partially circumscribed by said coil, said armature configured for magnetic coupling with said coil, said magnetic coupling urging said armature to move within said tube; said armature being configured to transmit a force imparted thereto by a magnetic flux output by said coil out of said electromagnetic actuator;
a flux adjustment element configured for movement within a magnetic flux output by said coil so as to increase a magnetic flux field input to said armature upon movement of said flux adjustment element in a first direction and to decrease a magnetic flux field Input to said armature upon movement of said flux adjustment element in a second direction;
wherein said flux adjustment element is externally disposed about said distal end of said tube adjacent said distal end of said armature;
wherein a force imparted to said armature by said magnetic flux output by said coil is output to one of a linear force transmission element and a rotational force transmission element;
wherein said linear force transmission element comprises a movable pin;
wherein said flux adjustment element is a cylindrical element configured to at least partially circumscribe said tube;
wherein said flux adjustment element is a threaded cylindrical element and wherein said distal end of said tube comprises an external threaded portion, said threaded cylindrical element and said external threaded portion configured for mating engagement;
an armature travel adjustment element, wherein said armature travel adjustment element is disposed to enter a distal end of said tube and is configured for movement in an advancing direction toward a proximal end of said tube and a withdrawing direction away from said proximal end of said tube so as to correspondingly increase or decrease an armature travel within said tube; and
wherein said armature travel adjustment element comprises a threaded portion on an exterior portion thereof and wherein said distal end of said tube comprises an internal threaded portion, said armature travel adjustment element threaded portion and said tube internal threaded portion configured for mating engagement.

* * * * *